United States Patent
Zeng et al.

(10) Patent No.: US 11,123,807 B2
(45) Date of Patent: Sep. 21, 2021

(54) CHUCK MULTI-MODE JAW MOVEMENT

(71) Applicants: APEX BRANDS, INC., Apex, NC (US); Jacobs Chuck Manufacturing Company, Ltd., Suzhou (CN)

(72) Inventors: Tingwei Zeng, Suzhou (CN); Jinping He, Suzhou (CN); Jie Zhang, Suzhou (CN)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 16/982,742

(22) PCT Filed: Mar. 21, 2018

(86) PCT No.: PCT/CN2018/079882
§ 371 (c)(1),
(2) Date: Sep. 21, 2020

(87) PCT Pub. No.: WO2019/178778
PCT Pub. Date: Sep. 26, 2019

(65) Prior Publication Data
US 2021/0008638 A1 Jan. 14, 2021

(51) Int. Cl.
*B23B 31/12* (2006.01)
(52) U.S. Cl.
CPC ........ *B23B 31/1238* (2013.01); *B23B 31/123* (2013.01); *B23B 2231/12* (2013.01)
(58) Field of Classification Search
CPC ............ B23B 31/1253; B23B 31/1612; B23B 31/1238; B23B 31/1207; B23B 31/123;
(Continued)

(56) References Cited

U.S. PATENT DOCUMENTS 3,807,745 A * 4/1974 Bent ................... B23B 31/1238
279/60
5,193,824 A 3/1993 Salpaka
(Continued)

FOREIGN PATENT DOCUMENTS

| CN | 202200065 U | 4/2012 | |
|---|---|---|---|
| CN | 104887287 A | 9/2015 | |
| WO | WO-2017024544 A1 * | 2/2017 | ........... B23B 31/123 |

OTHER PUBLICATIONS

International Search Report and Written Opinion from International Application No. PCT/CN2018/079882 filed on Mar. 21, 2018.

*Primary Examiner* — Eric A. Gates
*Assistant Examiner* — Chwen-Wei Su
(74) *Attorney, Agent, or Firm* — Burr & Forman, LLP

(57) ABSTRACT

A chuck for use with a power driver having a rotatable drive spindle is provided. The chuck may include a clamping assembly comprising a clamping member that operably couples the sleeve to a nut. The clamping assembly may be configured to transition the chuck between a rapid jaw adjustment mode and a clamping mode. In the rapid jaw adjustment mode, a sleeve may be configured to rotate the clamping member with the nut to cause rotational movement of the nut relative to jaws and a chuck body, which may cause translational movement of the jaws relative to the chuck body. In the clamping mode, the nut may be rotationally fixed with the jaws and the clamping member may rotate relative to the nut to cause the nut to move axially relative to a center axis of the chuck which causes the jaws to translate relative to the body and clamp onto a working bit.

12 Claims, 22 Drawing Sheets

(58) Field of Classification Search
CPC ............. B23B 2231/12; B23B 2231/38; Y10T 279/17623; Y10T 279/17632; Y10T 279/17615; Y10T 279/17649; Y10T 279/17658; Y10T 279/32; Y10S 279/902
See application file for complete search history.

(56) References Cited

U.S. PATENT DOCUMENTS

| | | | |
|---|---|---|---|
| 7,654,539 B2 * | 2/2010 | Yang | B23B 31/123 279/62 |
| 7,946,594 B2 * | 5/2011 | Tan | B23B 31/123 279/62 |
| 8,141,883 B2 * | 3/2012 | Hu | B23B 31/1238 279/62 |
| 2005/0023774 A1 | 2/2005 | Mack | |

* cited by examiner

CHUCK MULTI-MODE JAW MOVEMENT

TECHNICAL FIELD

Example embodiments generally relate to chucks for use with power drivers including drills, and more particularly, relate to chucks having multi-mode jaw actuation.

BACKGROUND

Power drivers with rotating drive spindles are often operably coupled to a chuck that is adjustable in size to be able to attach various working bits, such as drill bits or other tools that rotated by the drive spindle. Chucks typically employ moveable jaws that are operable to adjust the diameter of an opening in the chuck for receiving a working bit. The jaws of conventional chucks may be adjusted by rotating an external sleeve relative to the jaws. Rotation of the sleeve may operate to change the size of the opening in the chuck for receiving a working bit. To move the jaws between an open position and a closed position, where the jaws are secured around the working bit, can require numerous turns of the sleeve. Typically, the sleeve is coupled to a nut that engages teeth on the jaws and causes translation of the jaws into and out of the body of the chuck in response to turning the sleeve and therefore the nut. As such, the relationship between the amount of turning movement of the sleeve and associated translational movement of the jaws can be linear. Accordingly, numerous turns of the sleeve are often required and to transition the jaws between open and closed positions when installing or removing a working bit, leading to inefficiencies and excessive downtime for the power driver while changing working bits, particularly when turning the sleeve by hand.

SUMMARY OF SOME EXAMPLES

According to some example embodiments, an example chuck for use with a power driver having a rotatable drive spindle is provided. The chuck may comprise a plurality of jaws, wherein each jaw includes jaw teeth. The chuck may further comprise a body. In this regard, the plurality of jaws may be configured to rotate with the body about a center axis of the chuck. The chuck may further comprise a sleeve and a nut having nut teeth. The nut teeth may be operably coupled with at least some of the jaw teeth in a helically threaded coupling. The chuck may further comprise a clamping assembly comprising a clamping member that operably couples the sleeve to the nut. The clamping assembly may be configured to transition the chuck between a rapid jaw adjustment mode and a clamping mode. In the rapid jaw adjustment mode, the sleeve may be configured to rotate the clamping member with the nut to cause rotational movement of the nut relative to the jaws and the body, which may cause translational movement of the jaws relative to the body. In the clamping mode, the nut is rotationally fixed with the jaws and the clamping member rotates relative to the nut to cause the nut to move axially relative to the center axis which causes the jaws to translate relative to the body.

According to some example embodiments, another example chuck for use with a power driver having a rotatable drive spindle is provided. The chuck may comprise a plurality of jaws with each jaw including jaw teeth. The chuck may further comprise a body. In this regard, the plurality of jaws may be configured to rotate with the body about a center axis of the chuck. The chuck may further comprise a sleeve and a nut having nut teeth. The nut teeth may be operably coupled with at least some of the jaw teeth in a helically threaded coupling. The chuck may further comprise a clamping assembly comprising a clamping member that operably couples the sleeve to the nut. The clamping assembly may be configured to transition the chuck between a rapid jaw adjustment mode and a clamping mode. In the rapid jaw adjustment mode, the sleeve may be configured to rotate the clamping member with the nut to cause rotational movement of the nut relative to the jaws and the body which may cause translational movement of the jaws relative to the body at a first jaw opening diameter change to sleeve turn ratio. In the clamping mode, the nut may be rotationally fixed with the jaws and the sleeve may be configured to rotate the clamping member relative to the nut to cause the nut to move axially relative to the center axis which may cause the jaws to translate relative to the body at a second jaw opening diameter change to sleeve turn ratio. In this regard, the first jaw opening diameter change to sleeve turn ratio is greater than the second jaw opening diameter change to sleeve turn ratio.

BRIEF DESCRIPTION OF THE DRAWINGS

Figure 1:
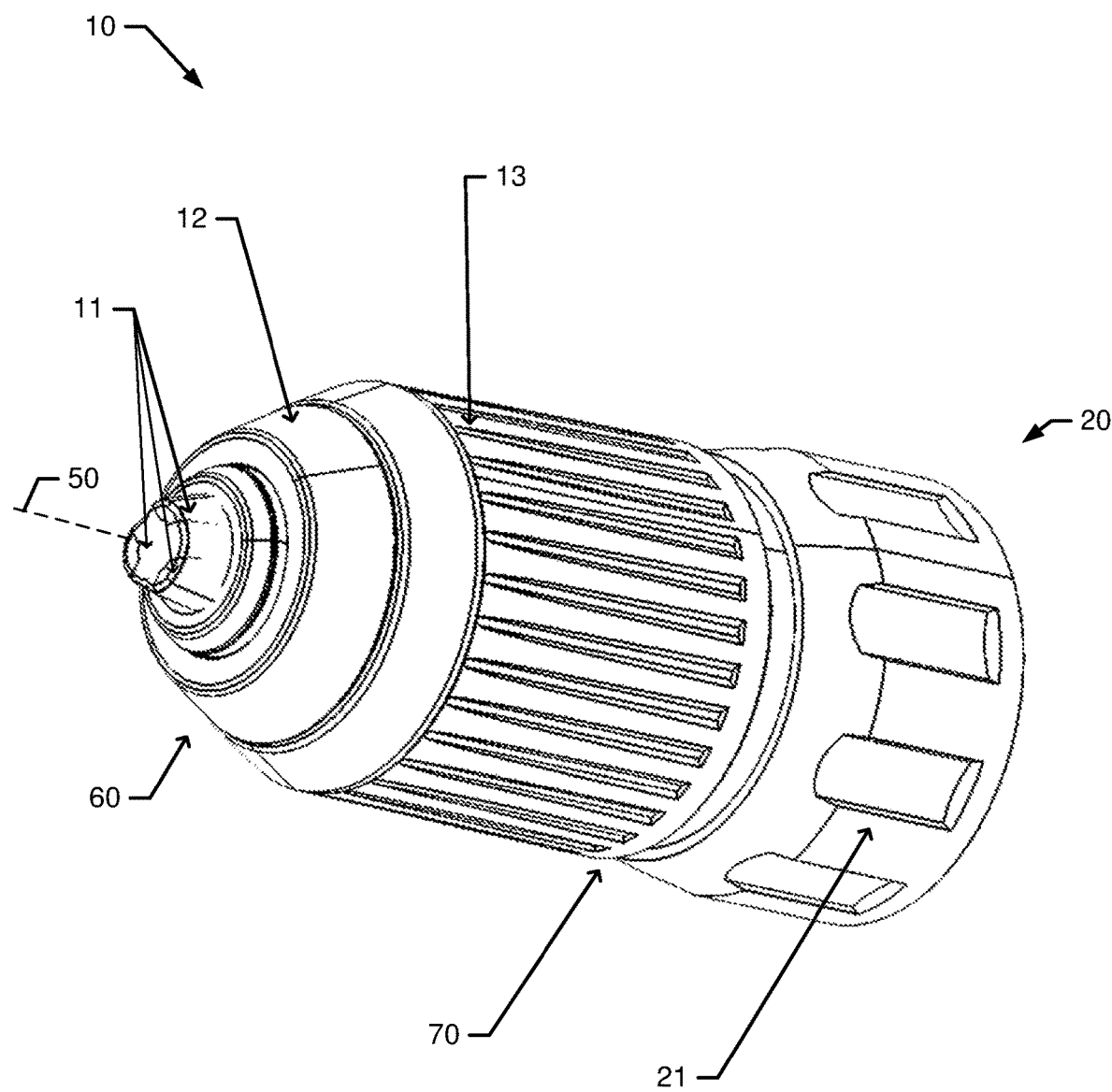
Figure 2:
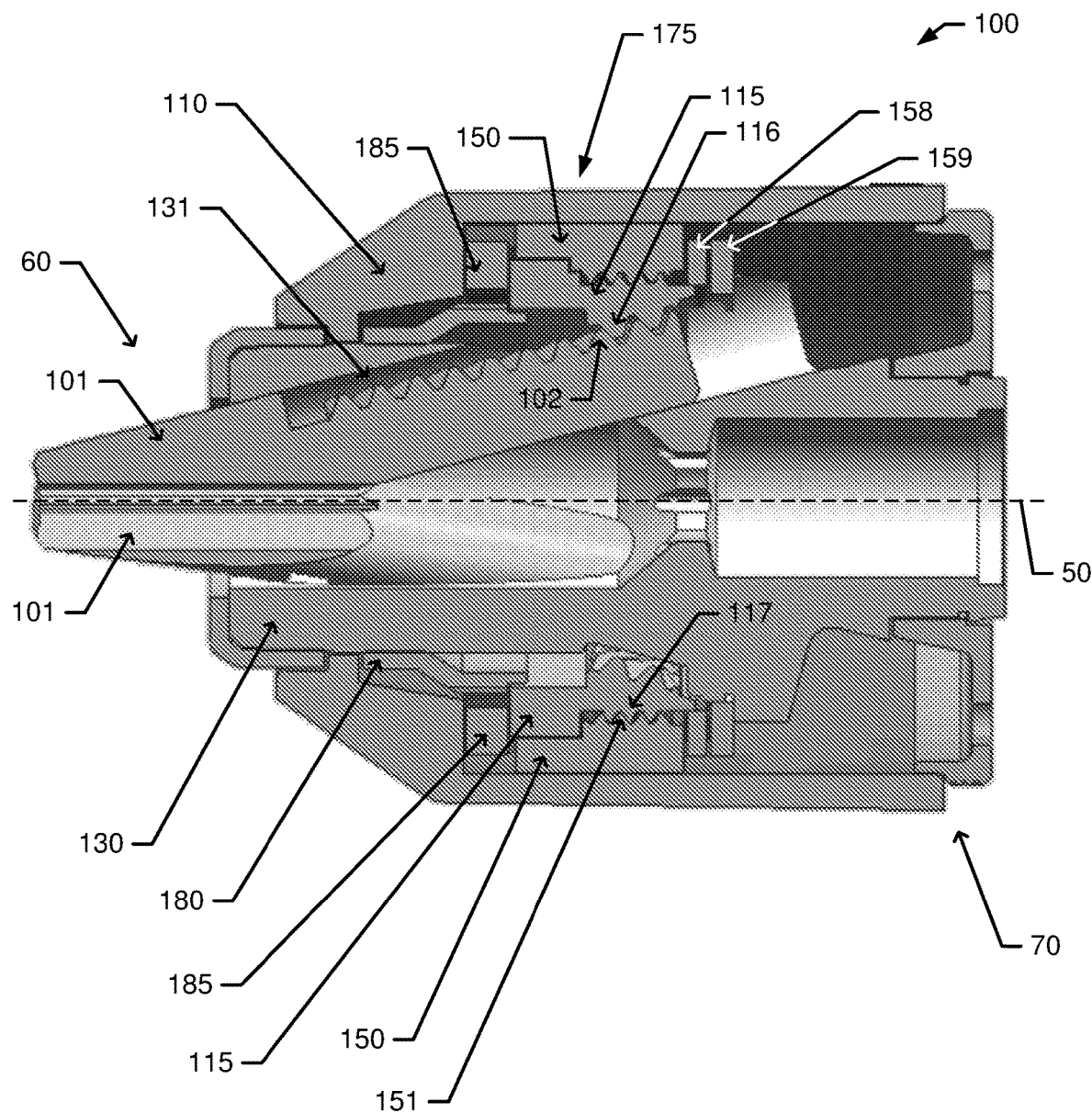
Figure 3:
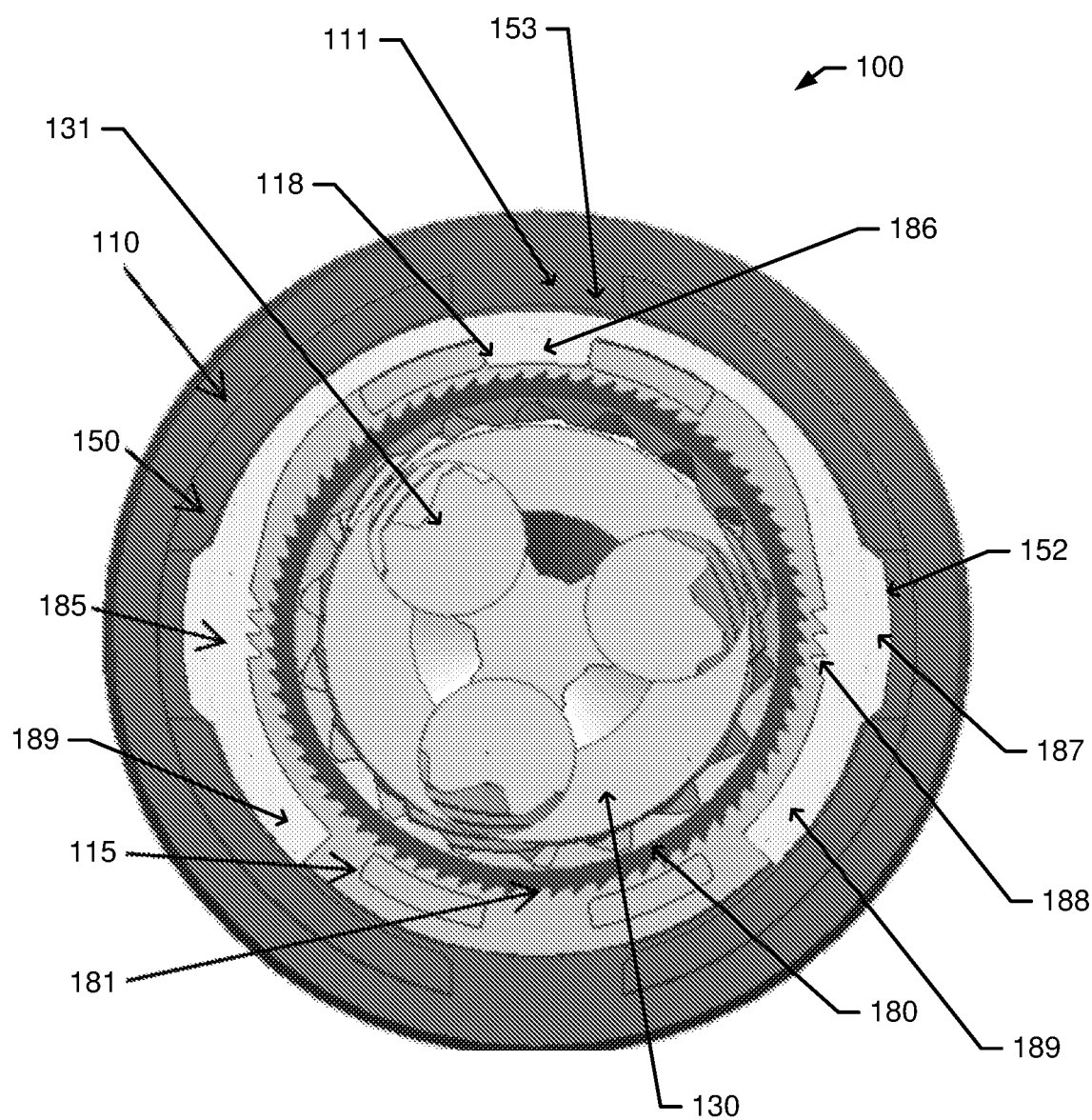
Figure 4:
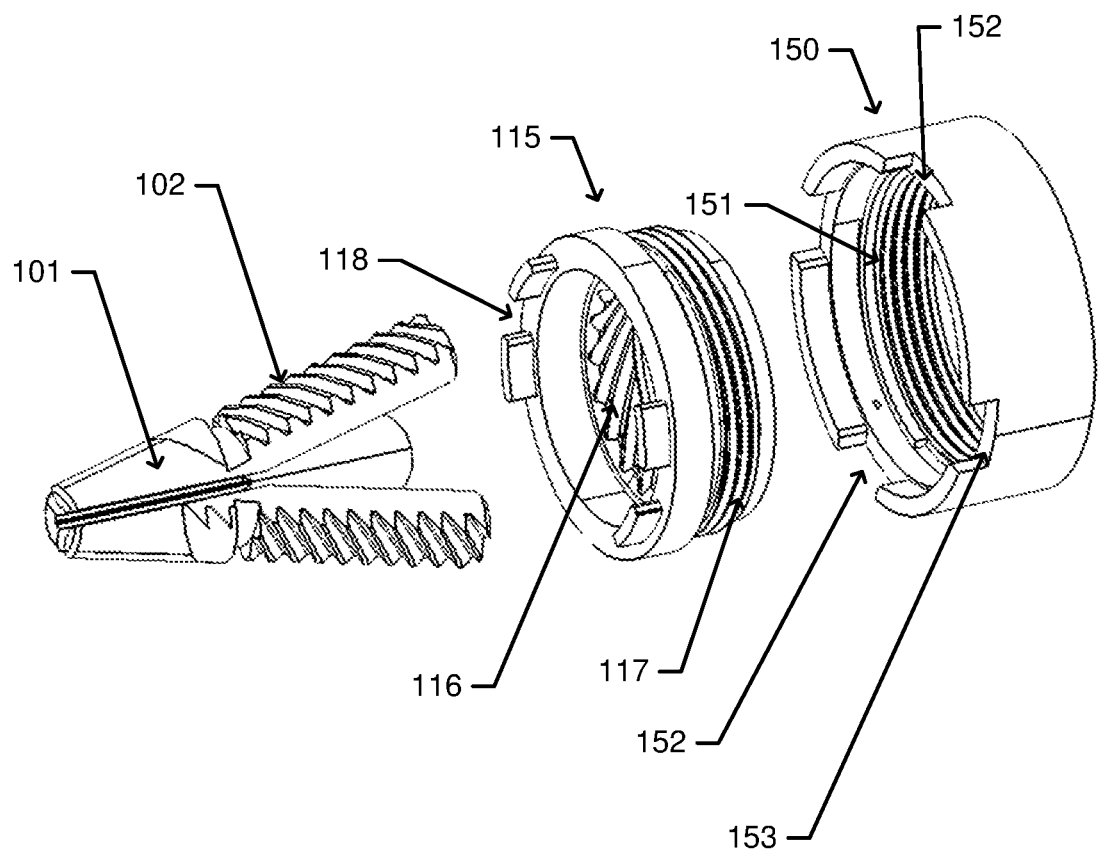
Figure 5:
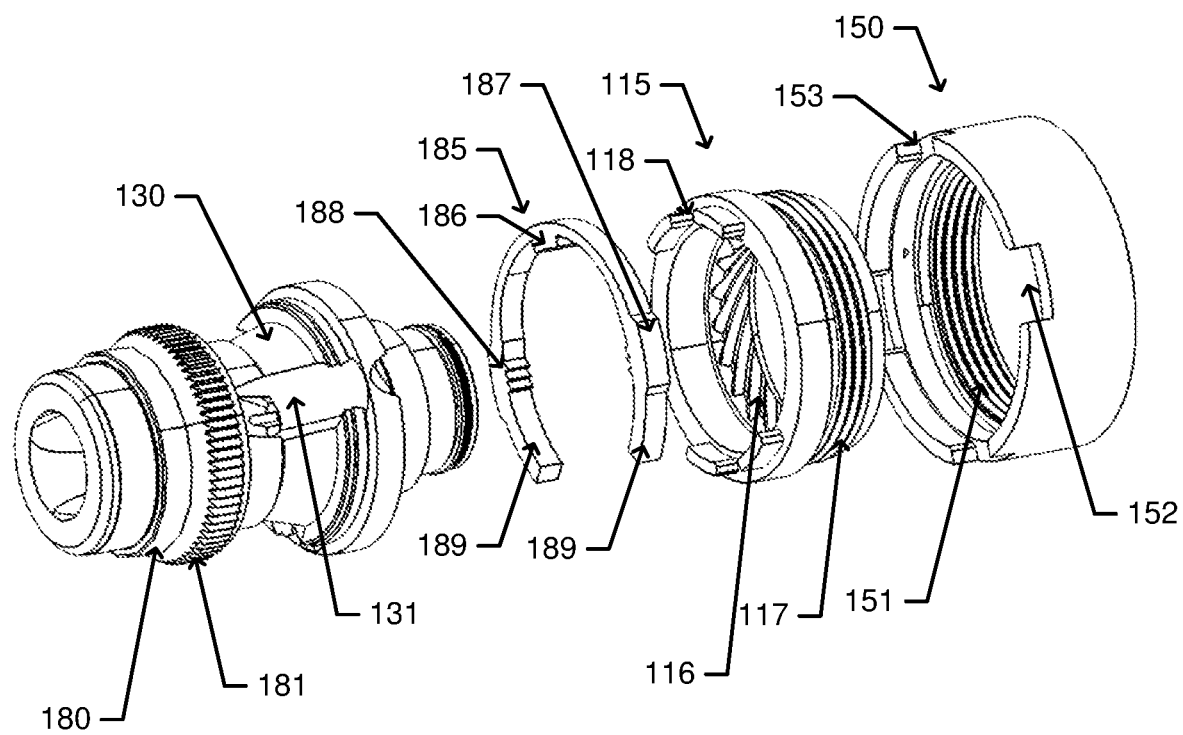
Figure 6:
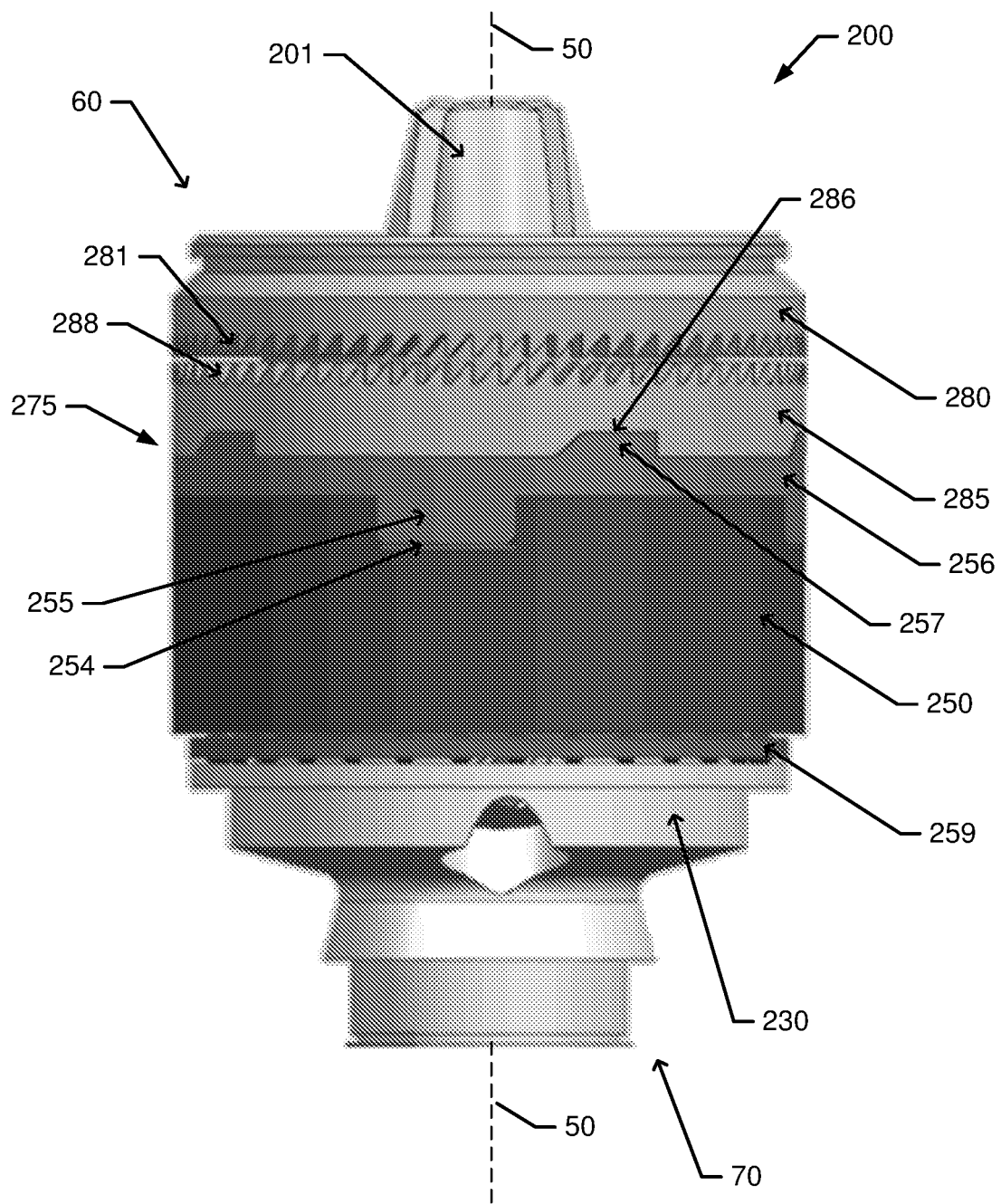
Figure 7:
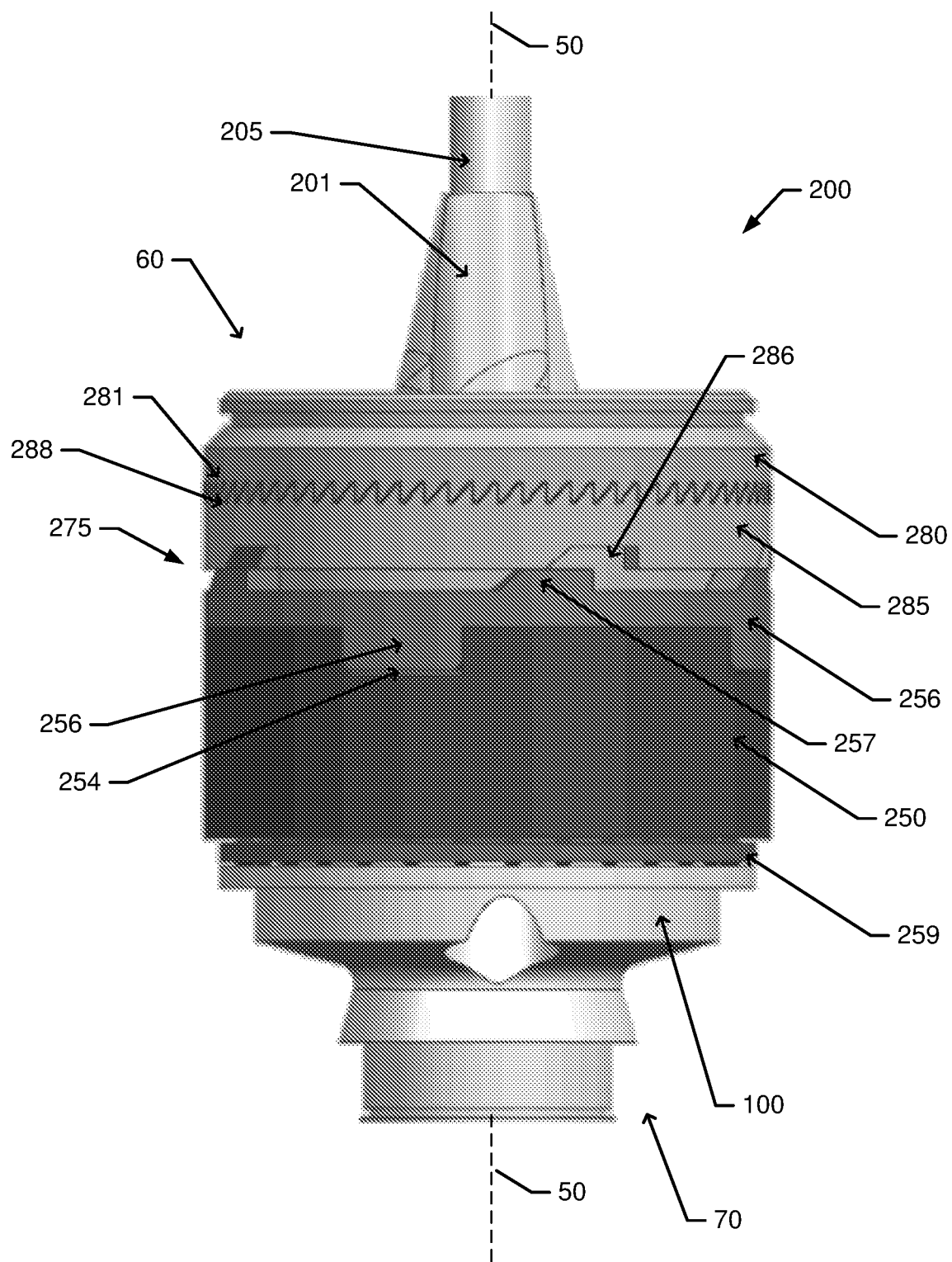
Figure 8:
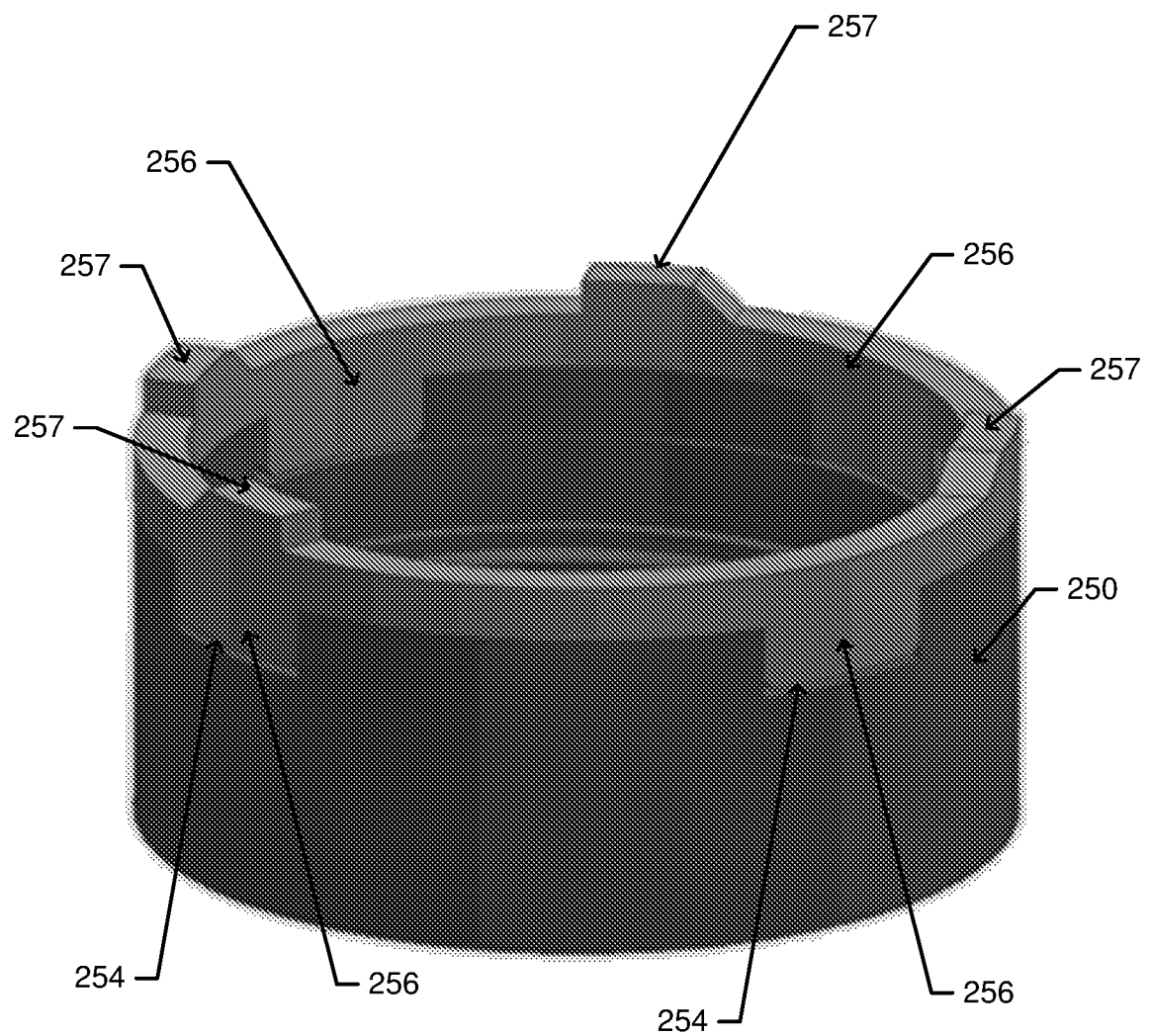
Figure 9:
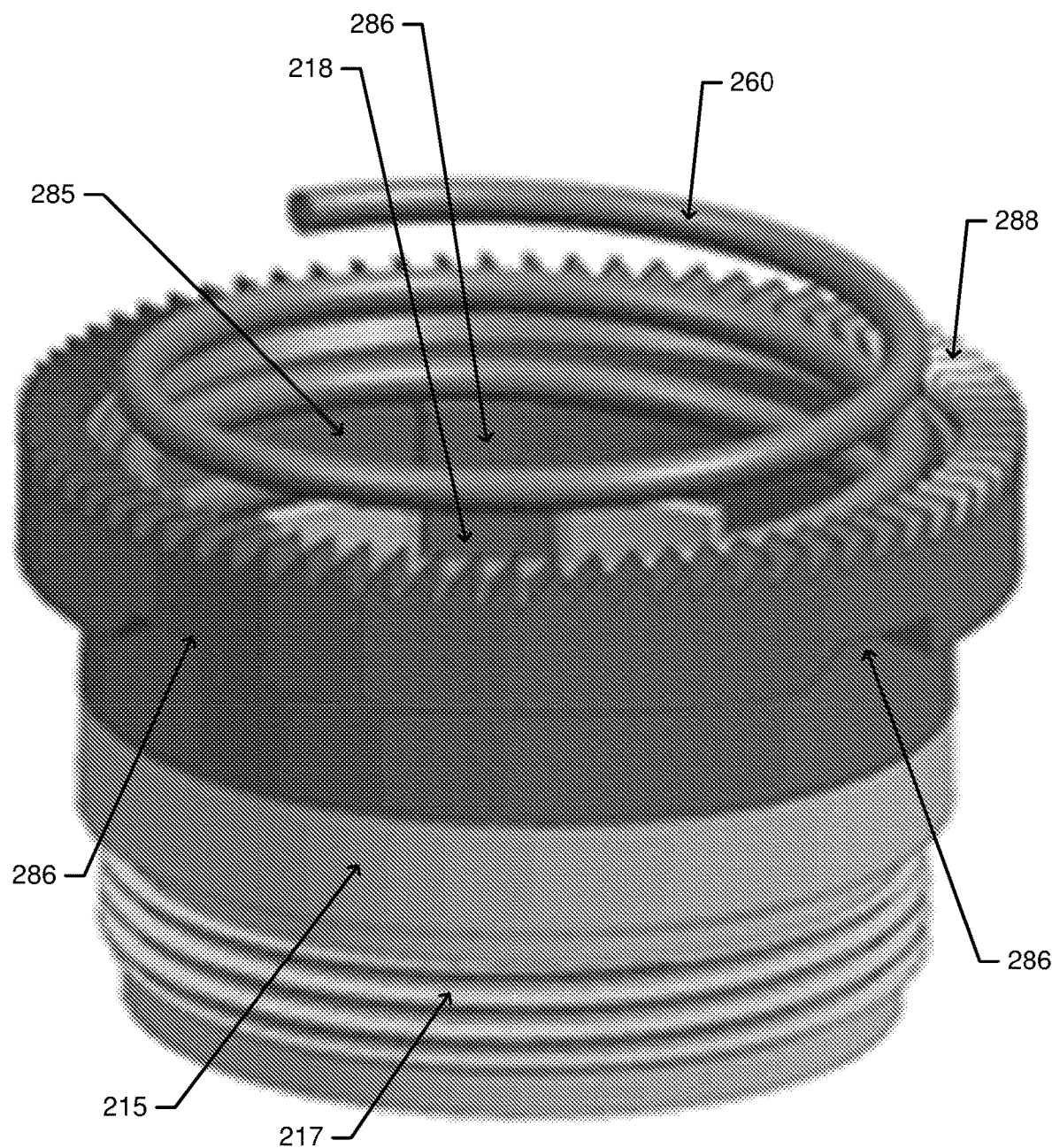
Figure 10:
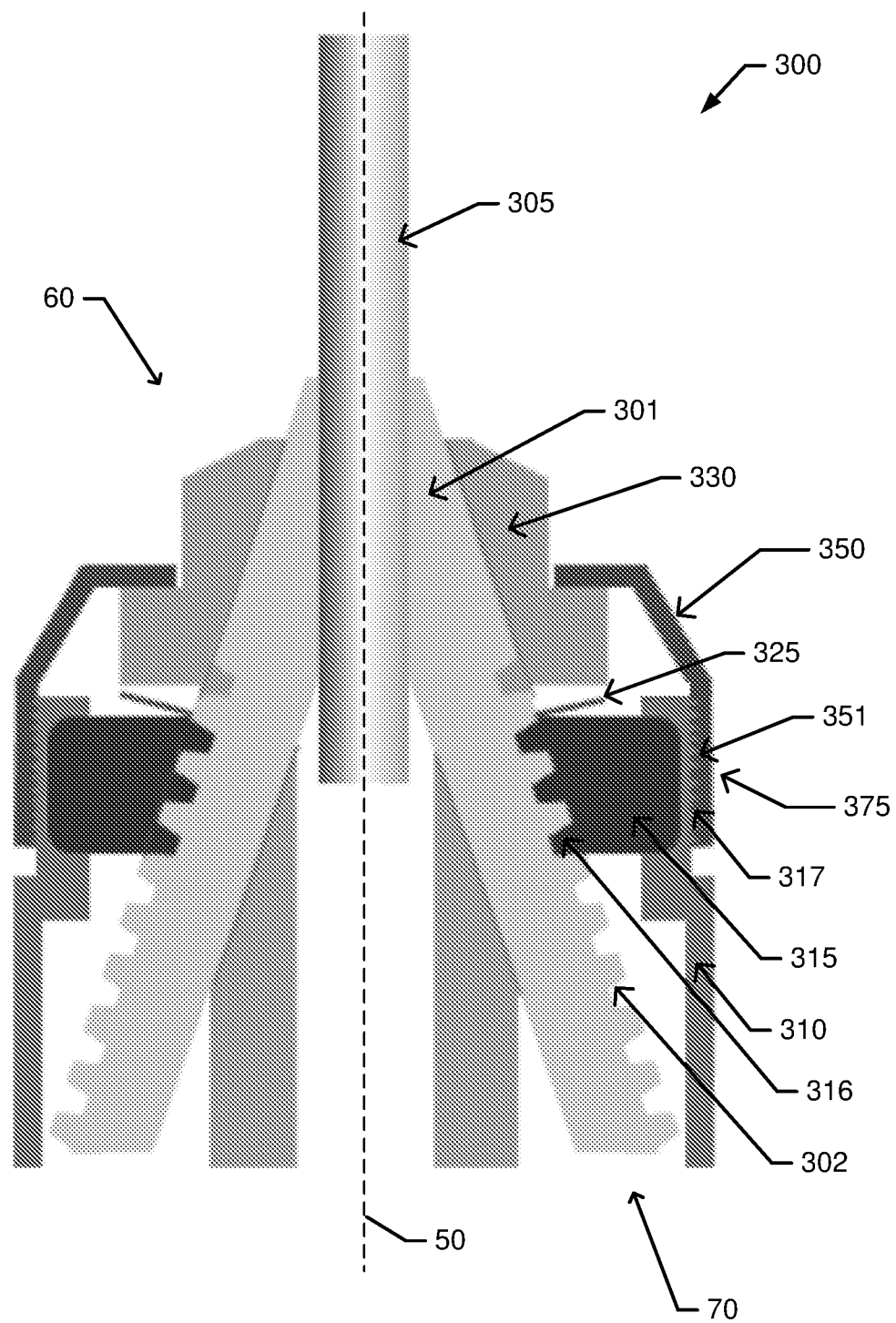
Figure 11:
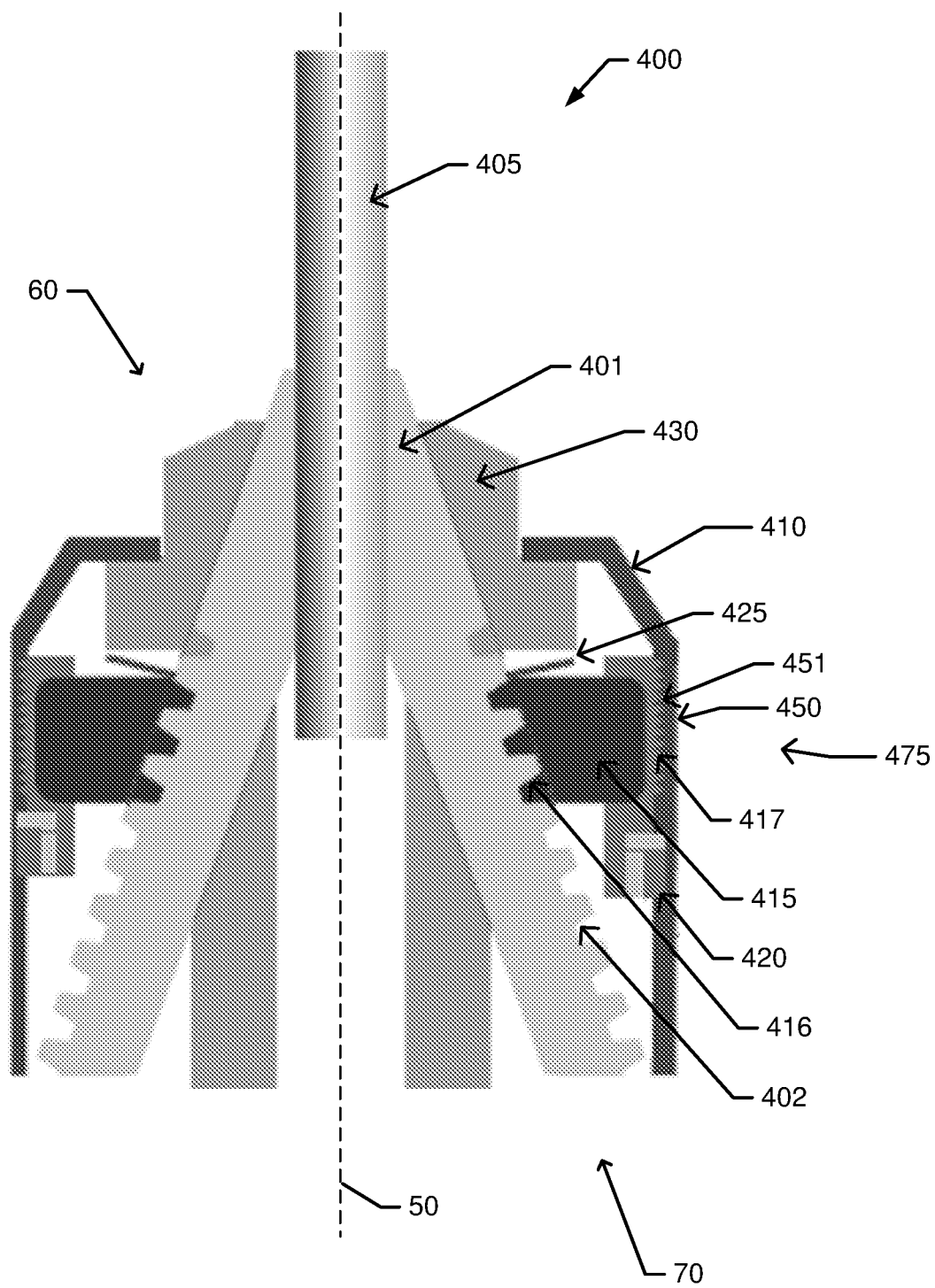
Figure 12:
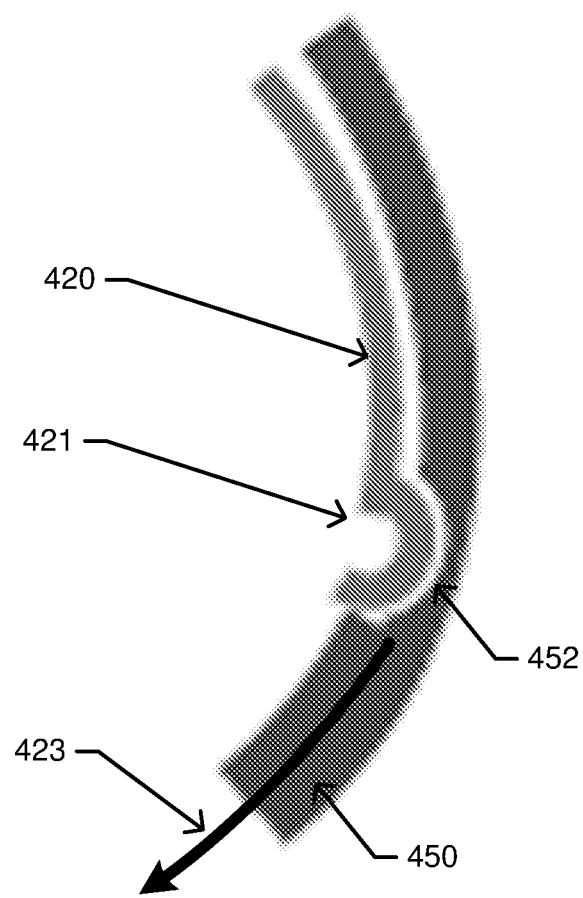
Figure 13:
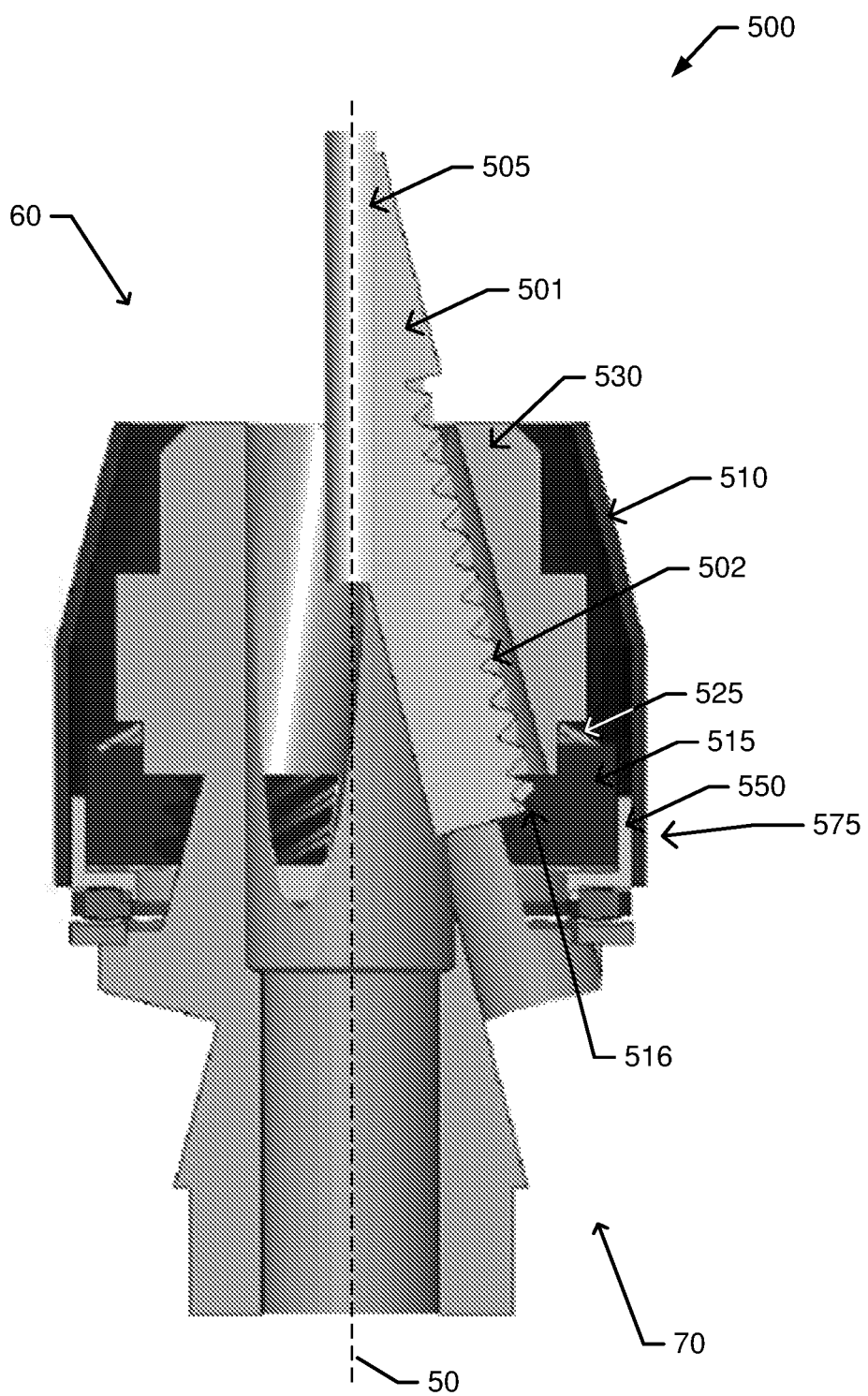
Figure 14:
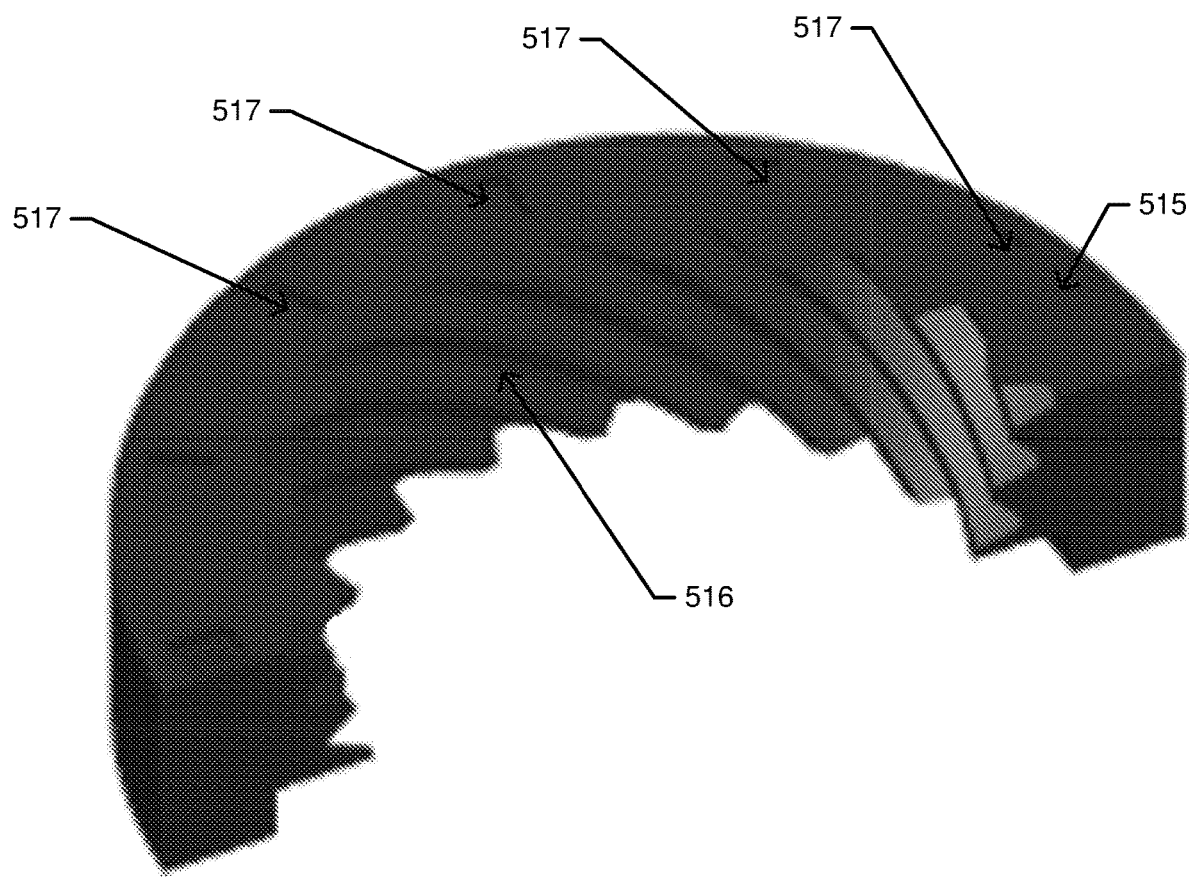
Figure 15:
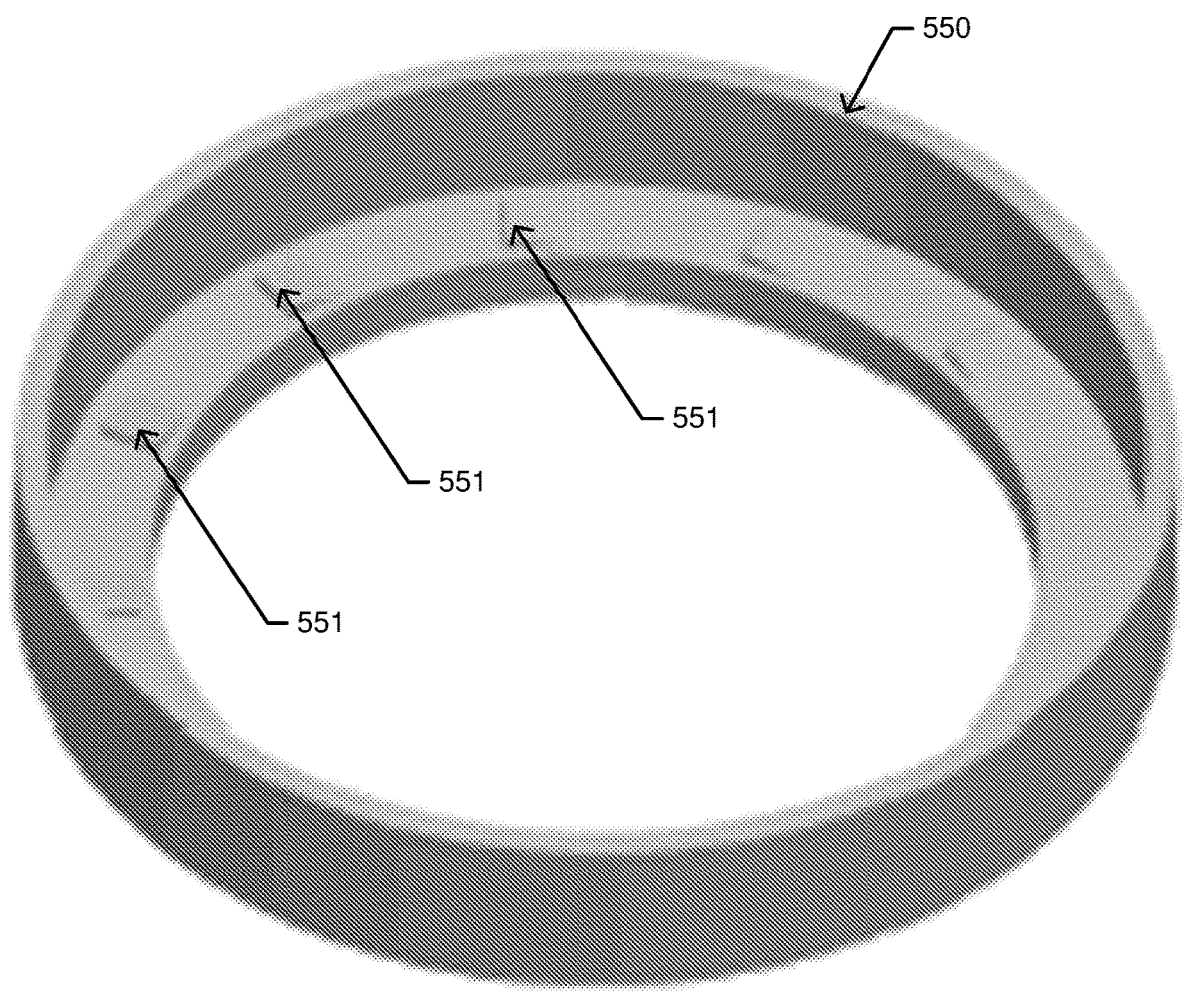
Figure 16:
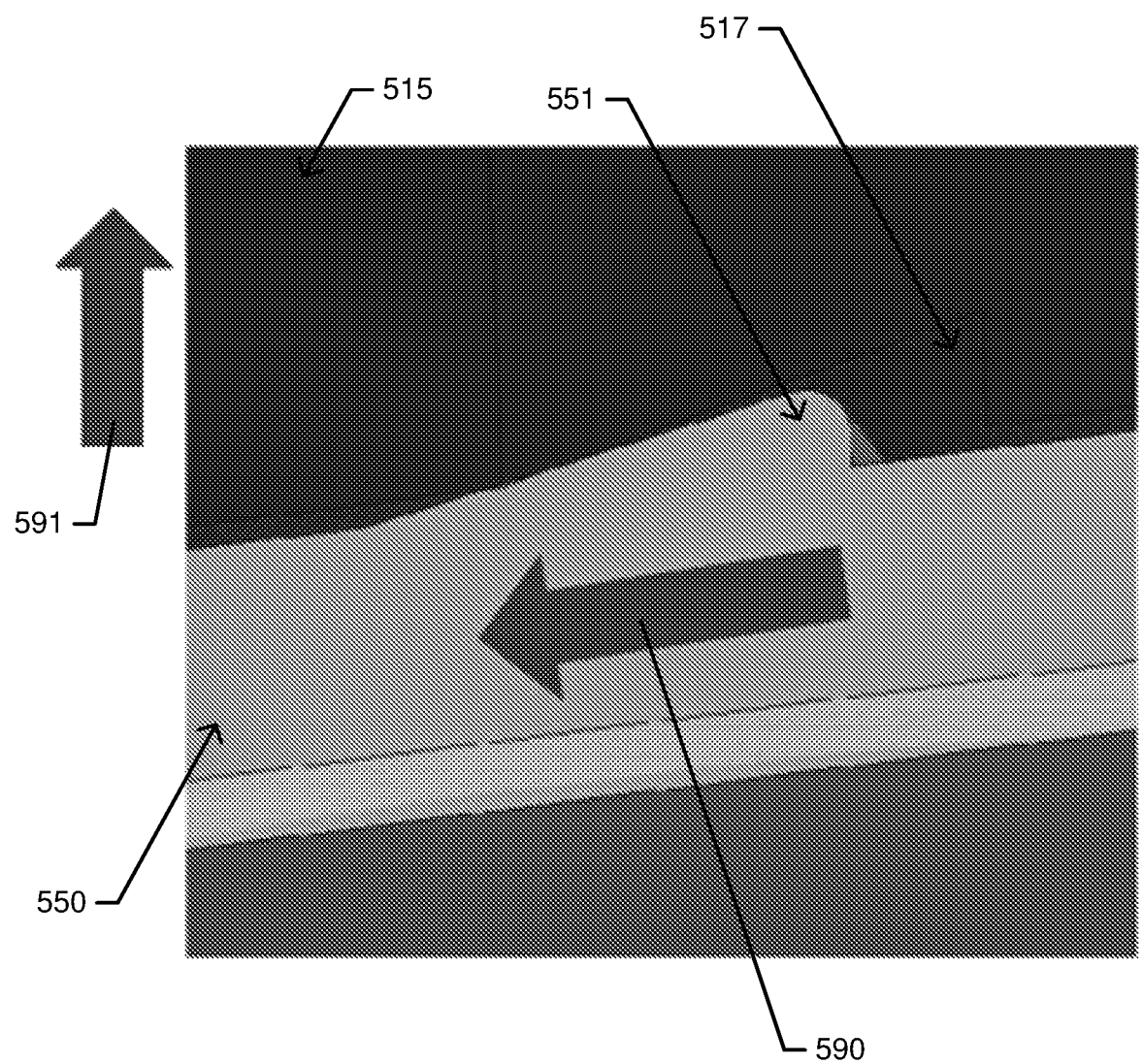
Figure 17:
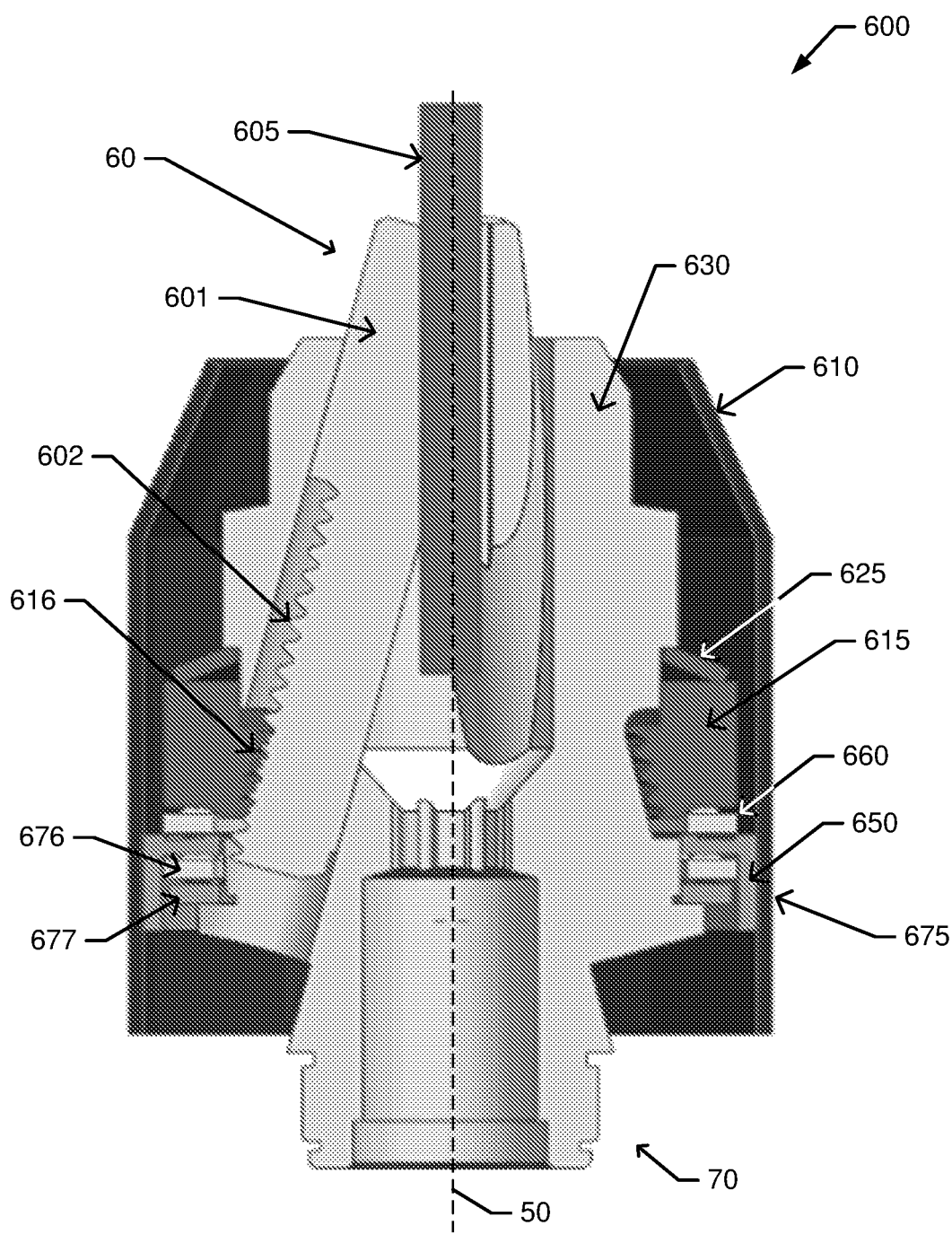
Figure 18:
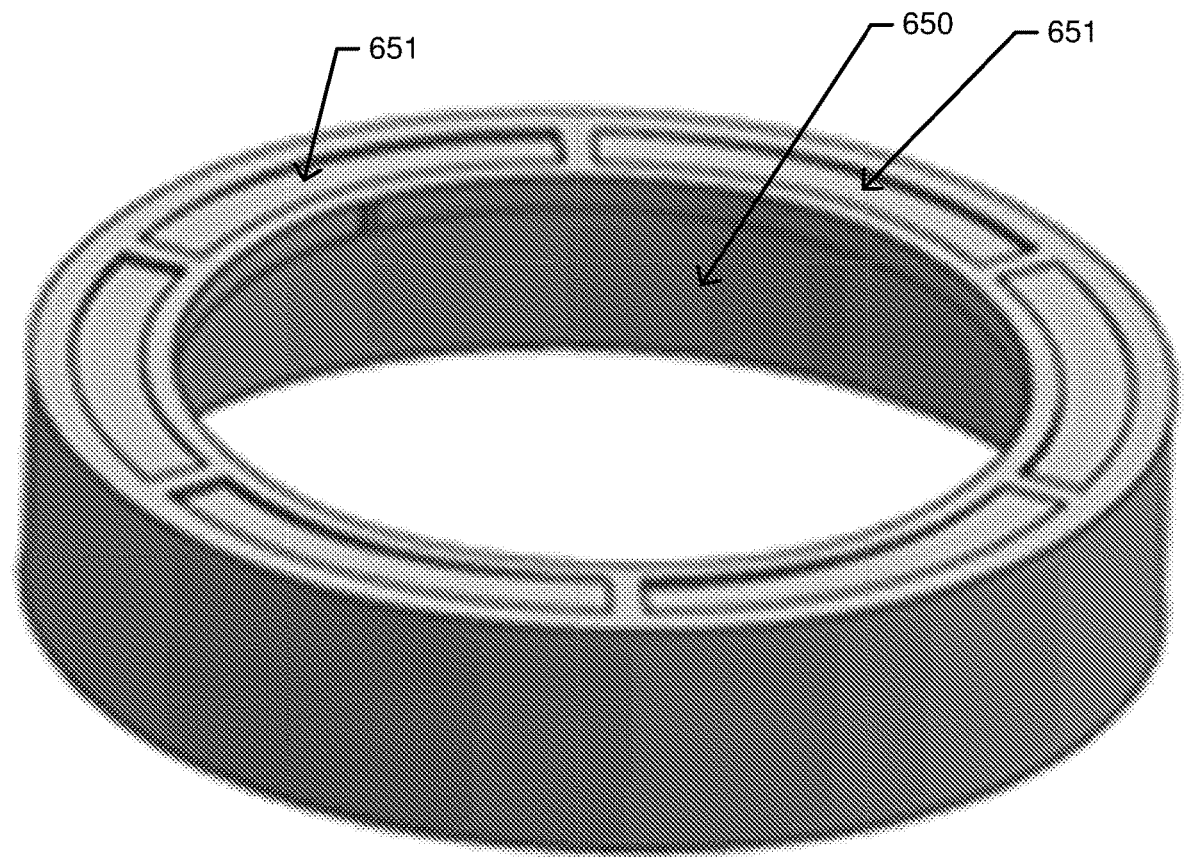
Figure 19:
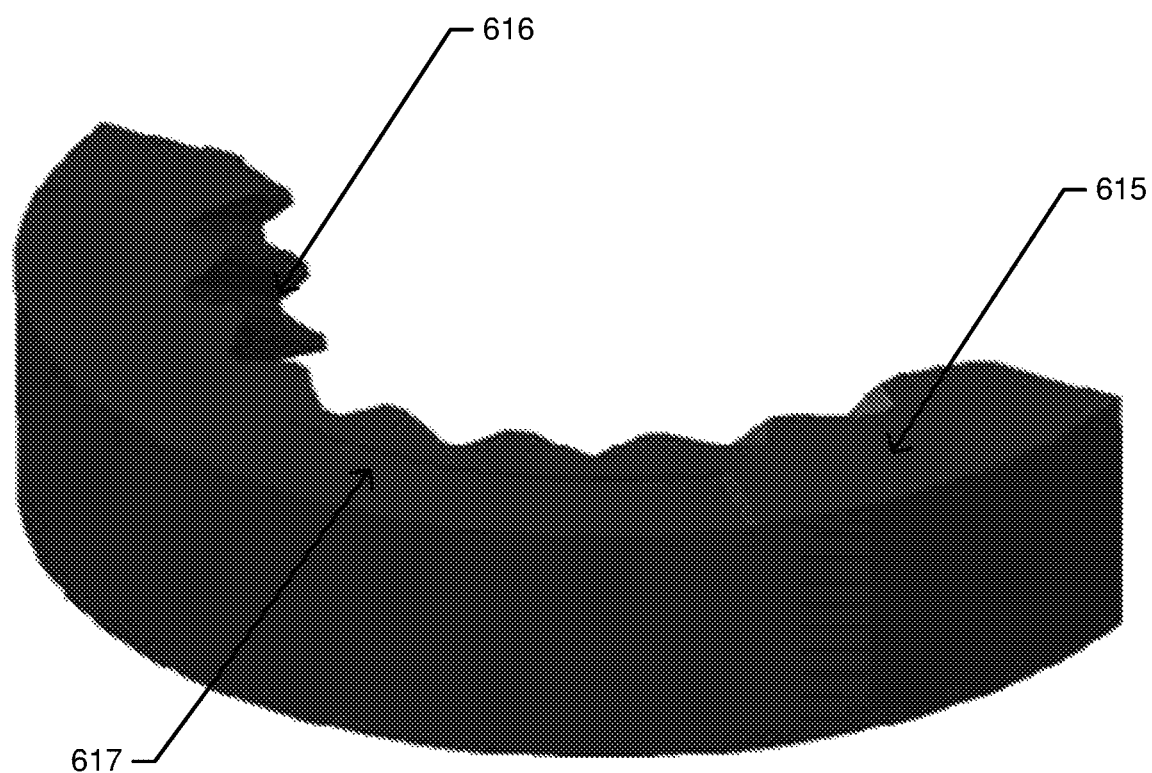
Figure 20:
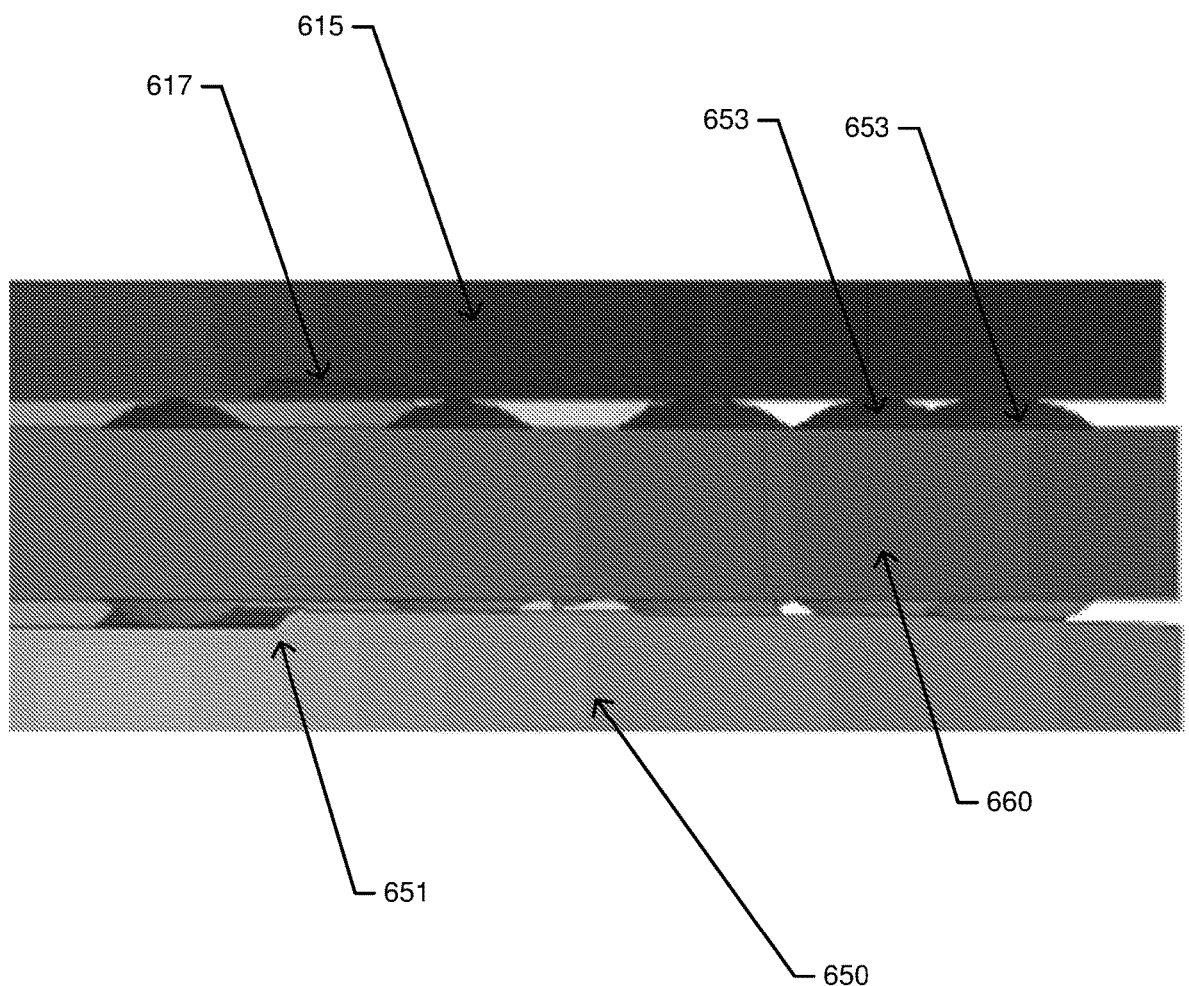
Figure 21:
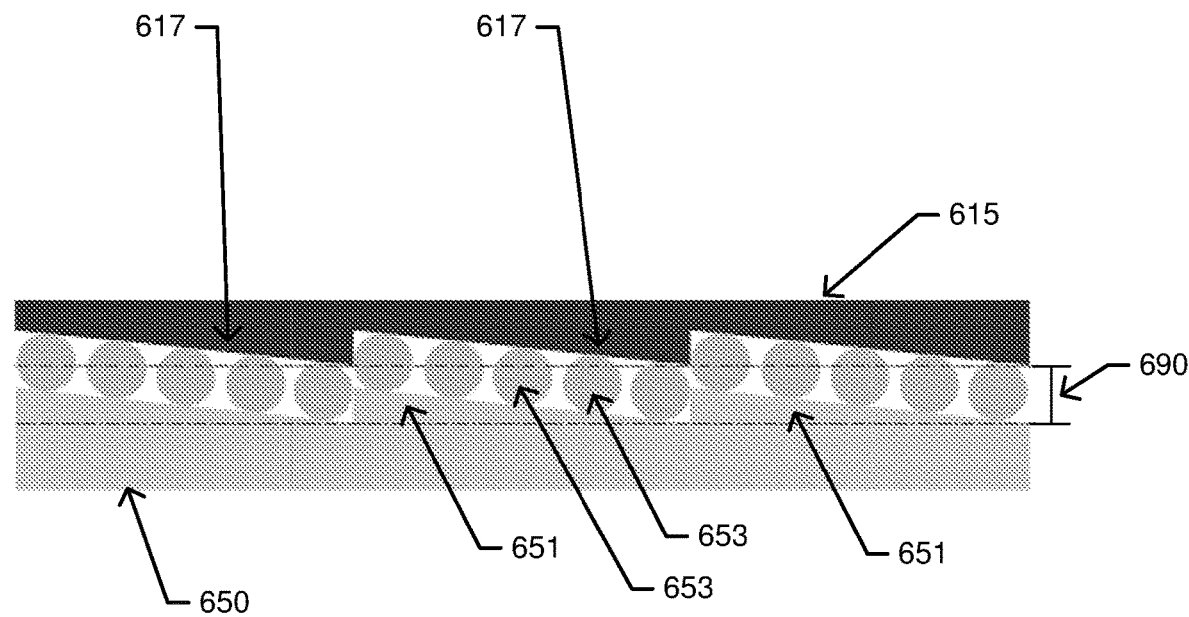
Figure 22:
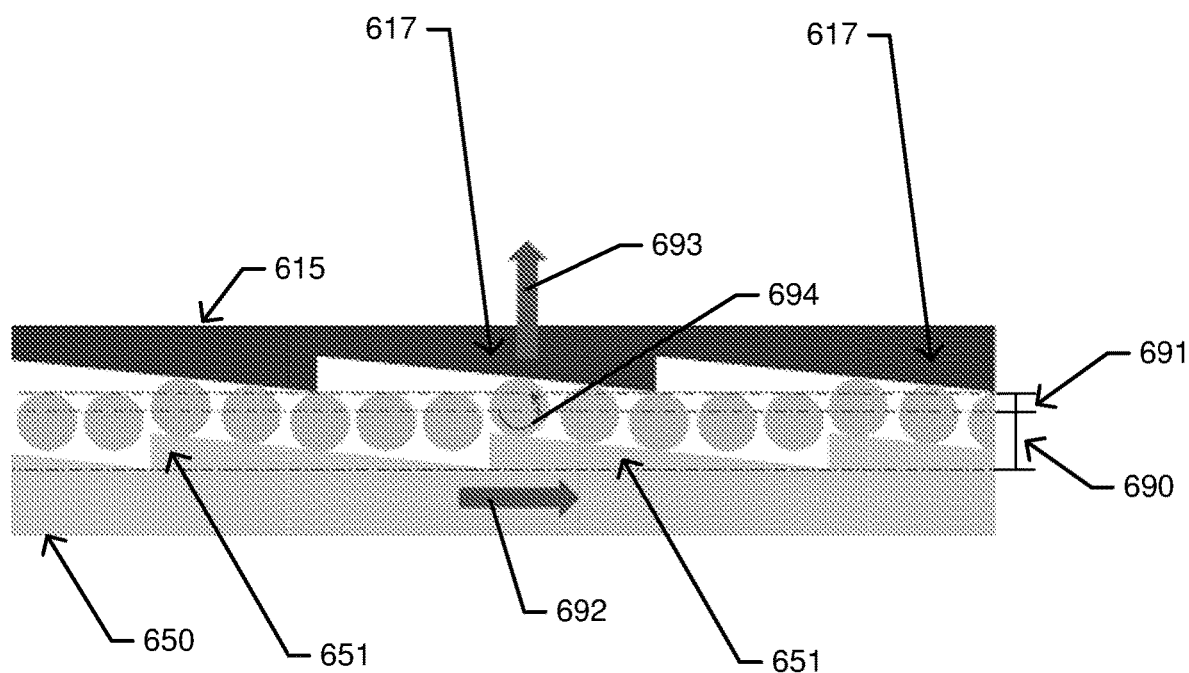

Having thus described some example embodiments in general terms, reference will now be made to the accompanying drawings, which are not necessarily drawn to scale, and wherein:

FIG. 1 illustrates a perspective side view of a chuck in accordance with an example embodiment;

FIG. 2 illustrates cross-section side view of a chuck in accordance with an example embodiment;

FIG. 3 illustrates a cross-section front view of the chuck of FIG. 2 in accordance with an example embodiment;

FIG. 4 illustrates a perspective side view of components of the chuck of FIG. 2 including a jaws, a nut, and a clamping member in accordance with an example embodiment;

FIG. 5 illustrates a perspective side view of components of the chuck of FIG. 2 including a retainer, a body, and a clutch in accordance with an example embodiment;

FIG. 6 illustrates a side view of components of another chuck in a rapid jaw adjustment mode in accordance with an example embodiment;

FIG. 7 illustrates a side view of components of the chuck of FIG. 6 in a clamping mode in accordance with an example embodiment;

FIG. 8 illustrates a perspective side view of a clamping member of the chuck of FIG. 6 in accordance with an example embodiment;

FIG. 9 illustrates a perspective side view of a nut and clutch of the chuck of FIG. 6 in accordance with an example embodiment;

FIG. 10 illustrates a side cross-section view of another chuck in accordance with an example embodiment;

FIG. 11 illustrates a side cross-section view of another chuck in accordance with an example embodiment;

FIG. 12 illustrates the operation of a deflection arm of the chuck of FIG. 11 in accordance with an example embodiment;

FIG. 13 illustrates a side cross-section view of another chuck in accordance with an example embodiment;

FIG. 14 illustrates a perspective cross-section view of a nut of the chuck of FIG. 13 in accordance with an example embodiment;

FIG. 15 illustrates a perspective front view of a clamping member of the chuck of FIG. 13 in accordance with an example embodiment;

FIG. 16 illustrates a view of the operable engagement of a nut and a clamping member of the chuck of FIG. 13 in accordance with an example embodiment;

FIG. 17 illustrates a side cross-section view of another chuck in accordance with an example embodiment;

FIG. 18 illustrates a perspective front view of a clamping member of the chuck of FIG. 17 in accordance with an example embodiment;

FIG. 19 illustrates a perspective view of a nut of the chuck of FIG. 17 in accordance with an example embodiment;

FIG. 20 illustrates a zoomed in view of a nut, a bearing, and a clamping member of the chuck of FIG. 17 in accordance with an example embodiment;

FIG. 21 illustrates a view of the operable engagement of a nut, bearing balls, and a clamping member of the chuck of FIG. 17 in the rapid jaw adjustment mode in accordance with an example embodiment; and FIG. 22 illustrates a view of the operable engagement of a nut, bearing balls, and a clamping member of the chuck of FIG. 17 in the clamping mode in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

For many conventional chucks, turning the sleeve of the chuck turns a nut internal to the chuck and through screw action of a helical thread between the nut and the jaws of the chuck, the jaws translate to extend into a closed position to clamp onto a working bit or retract into an opening position that permits a working bit to be removed or installed. As such, one option for reducing the number of turns of the sleeve to close or open the jaws may be to increase the slope of the helical thread between the nut and jaws thereby increasing the jaw translation and the diameter of the jaw opening at a higher rate relative to the amount of turn applied to the sleeve. In other words, increasing the slope of the threading may increase the jaw opening diameter change to sleeve turn ratio—that is the change in the diameter of the jaw opening relative to the amount of turn performed by the sleeve. However, a technical problem with increasing the slope of the helical threaded coupling is that the surface area engagement of the threads decreases in the direction of tightening and therefore the frictional forces are reduced that would typically operate to permit the nut to be tightened onto the jaws. As such, increasing the slope of the threading increases the likelihood that the nut may slip relative to the jaws during use of the chuck and an unintended loosening of the jaws on the working bit may result. Therefore, a technical problem to overcome is to design a chuck that has a relatively high jaw opening diameter change to sleeve turn ratio, but also doesn't suffer from the risk of the nut slipping relative to the jaws or the nut simply not being able to be tightened onto the jaws due to a lack of frictional engagement in the teeth of the threads.

According to various example embodiments, a chuck is provided that changes modes between a rapid jaw adjustment mode and a clamping mode during the installation or removal of a working bit from the jaws of the chuck. Generally speaking, in the rapid jaw adjustment mode, the nut may rotate about a center axis of the chuck and engage with the jaws via a helically threaded coupling to cause translational movement of the jaws to change the diameter of the jaw opening. The helically threaded coupling may have a relatively large slope and thus a relatively high change in jaw opening diameter for a given turn distance of the sleeve, since the sleeve rotates the nut in the rapid jaw adjustment mode. In this regard, for example, the threaded teeth of the nut and the jaws may be configured such that the jaws may translate from a maximum jaw opening diameter of 13 mm to a minimum jaw opening diameter of 1.5 mm in response to a half turn or 180 degree turn of the sleeve.

Additionally, according to some example embodiments, when a torque required to turn the sleeve, for example during a working bit installation process, exceeds a threshold torque (i.e., due to physical engagement of the jaws with the working bit), a feature of a clamping assembly of the chuck may respond by, for example, slipping into another position due to the increased torque thereby causing other changes in the chuck to transition from the rapid jaw adjustment mode to a clamping mode. In the clamping mode, the nut may no longer rotate relative to the jaws, but may rather the jaws may be clamped onto the working bit by moving the nut axially with the jaws in response to further turning of the sleeve. This tightening or clamping of the jaws in the clamping mode may not be reliant on turning of the helically threaded coupling between the nut and the jaws to tighten and clamp the jaws onto the working bit. As such, a technical effect of this approach is an ability to clamp onto the working bit tightly, while still having the efficiency of a relatively high jaw translation movement to sleeve turn ratio to move the jaws at a high rate when not engaged with a working bit. Accordingly, the jaw opening diameter change to sleeve turn ratio for the rapid jaw adjustment mode is greater or even substantially greater than the jaw opening diameter change to sleeve turn ratio for the clamping mode which permits rapid changes in diameter of the jaw opening in the rapid jaw adjustment mode but tightening of the jaws in the clamping mode. The issues with slipping and an inability to tighten the nut due to the relatively high slope helical threading are alleviated because the final clamping of the jaws onto the working bit is performed by a clamping assembly that is not reliant on the relatively high sloped helical thread for clamping purposes. Having described some example features, the following provides various different example embodiments to solve these and other technical problems in the art.

As such, FIG. 1 illustrates and example chuck 10 according to some example embodiments. In this regard, in FIG. 1, the chuck 10 is shown as being physically coupled to a portion of a power driver 20, which may be, for example, a pneumatic or electric powered tool (e.g., a drill) configured to rotate a drive spindle that is operably coupled to the chuck 10. The chuck 10 may define a center axis 50. For orientation purposes, the chuck 10 may have a forward end 60 and a rearward end 70. As seen in FIG. 1, the chuck 10 may comprise, among other components, jaws 11, a nose 12, and a sleeve 13. As further described herein, the jaws 11 may be configured to move or translate in a closing or opening direction in response to the rotation of the sleeve 13. Further, rotation of the sleeve 13 may operate to cause translational movement of the jaws 11 in both the rapid jaw adjustment mode and the clamping mode, as further described herein. The power driver housing 21 may be a component of the power driver 20.

FIGS. 2 through 5 illustrate an example chuck 100 and components thereof in various views that can be referenced together to facilitate understanding the various example embodiments. In this regard, FIG. 2 provides a cross-section side view of the chuck 100, FIG. 3 provides a front cross-section view of the chuck 100, and FIGS. 4 and 5 provide exploded views of various select components of the chuck 100. The chuck 100 may define a center axis 50. For orientation purposes, the chuck 100 may have a forward end 60 and a rearward end 70.

The cross-section side view of FIG. 2 shows the chuck 100, which may be affixed to a power driver such as the power driver 20. The chuck 100 may include various components that operate together to permit the chuck 100 to clamp onto and secure a working bit (not shown) to the drive spindle of a power driver to, for example, turn a fastener, drill a hole, or the like. Among other components, the chuck 100 may include jaws 101, a sleeve 110, a nut 115, a body 130, and a clamping assembly 175. The body 130 may be a component that is affixed to the drive spindle and transfers rotation of the drive spindle to the jaws 101 to drive the working bit. The jaws 101 may be operably coupled to the body 130 via jaw passageways 131 in the body 130. Because the jaws 101 are rotationally constrained in the jaw passageways 131, the jaws rotate with the body 130. However, the jaws 101 may be configured to move or translate relative to the body 130 within the jaw passageways 131 in response to forces applied on the jaws 101 via the nut 115 to change the diameter of the jaw opening. According to some example embodiments, the chuck 100 may include three jaws 101 and the body 130 may include three associated jaw passageways 131. The jaw passageways 131 may operate to permit the jaws 101 to move rearward into the body 130 (i.e., in a jaw opening direction to increase the diameter of the jaw opening) and forward out of the body 130 (i.e., in a jaw closing direction to reduce the diameter of the jaw opening). In this regard, as the jaws 101 move forward within the passageways 131 in the jaw closing direction, the jaws 101 may move along a respective angle relative to the center axis 50 such that the jaws 101 decrease the diameter of the jaw opening and meet at a point on the center axis 50 forward of the body 130 Similarly, as the jaws 101 move rearward within the passageways 131 in the jaw opening direction, the jaws 101 may move along the respective angles relative to the center axis 50 such that the jaws 101 move away from that point on the center axis 50 forward of the body 130 and increase the diameter of the jaw opening. Via this jaw translational, angular movement, adjustability is provided such that the jaws 101 may engage working bits having different sized shafts. Accordingly, the jaws 101 may move relative to the body 130 in the jaw passageway 131, but the jaws 101 may be operably coupled to the body 130 such that the jaws 101 rotate with the body 130.

The sleeve 110 may be disposed externally on the chuck 100 and may take the form of an open cylinder with some of the components of the chuck 100 being disposed within the sleeve 110. The sleeve 110 may operate as a user interface to the chuck 100 to control the opening and closing of the jaws 101 in both the rapid jaw adjustment mode and the clamping mode. The sleeve 110 may be configured to rotate about the center axis 150 to cause the jaws 101 to move in either the opening or closing direction based on the direction of rotation of the sleeve 110. As such, the sleeve 110 may be configured to rotate relative to the jaws 101 and the body 130, until the jaws 101 are clamped onto the working bit and thus the sleeve 110 has caused a tightened engagement.

The sleeve 110 may operate to move the nut 115 of the chuck 100 to cause the jaws 101 to translate within the body 130. In this regard, the nut 115 may include nut teeth 116 that operably couple to jaw teeth 102 in a helically threaded coupling. A helically threaded coupling is one where at least one of the sets of teeth are helically threaded in order to convert rotational movement into linear movement. As such, when the nut 115 turns relative to the jaws 101, the jaws 101 move in either opening or closing direction. Such relative movement of the nut 115 to the jaws 101 may occur when the chuck is in the rapid jaw adjustment mode. In this regard, the slope of the helical threaded coupling between the nut teeth 116 and the jaw teeth 102 may be relatively large and therefore the rotation of sleeve 110 that results in simultaneous rotation of the nut 115 relative to the jaws 101 may be performed at a relatively high jaw opening diameter change to sleeve turn ratio. For example, the threaded teeth of the nut 115 and the jaws 102 may be configured such that the jaws 101 may translate from a maximum jaw opening diameter of 13 mm to a minimum jaw opening diameter of 1.5 mm in response to a half turn or 180 degree turn of the sleeve 110. As such, according to some example embodiments, when in the rapid jaw adjustment mode, relatively less turning of the sleeve 110 is required to move the jaws 101 and change the diameter of the jaw opening, for example, from a maximum open position to a position where the jaws 101 initially engage with a working bit.

The nut 115 also performs a role in the clamping mode due to the nut 115's operable coupling with the clamping assembly 175. According to some example embodiments, the clamping assembly 175 may include a clamping member 150 and a clutch 185. As shown in FIG. 2, the clamping member 150 may operate as an outer nut disposed between the sleeve 110 and the nut 115. The clamping member 150 may be a circular ring with various features for performing the operations of the clamping member 150 as described herein. The clamping member 150 may rotate together with the sleeve 110 in both the rapid jaw adjustment mode and the clamping modes. In this regard, with reference to FIG. 3 which is a cross-section front view of the chuck 100, it can be seen that the sleeve 110 includes a sleeve lug 111 that extends into a clamping member slot 153 of the clamping member 150. Via the engagement of the sleeve lug 111 and the clamping member slot 153, the sleeve 110 and the clamping member 150 rotate together as a unit. Additionally, the clamping member 150 may be configured to rotate but not be permitted to move axially in a rearward direction due to rearward axial movement of the clamping member 150 being restricted from moving axially by a bearing 158 and washer 159 which is axially fixed.

The clutch 185 may operate cause the chuck 100 to transition between the rapid jaw adjustment mode and the clamping mode. In this regard, when a user is turning the sleeve 110 while in the rapid jaw adjustment mode, at some point the jaws 101 come into contact with a working bit to be installed in the chuck 100 and further rotation of the sleeve 110 is inhibited. When this engagement with the working bit occurs, the torque required to continue to turn the sleeve 110 increases. According to some example embodiments, when the torque to turn the sleeve 110 increases to a threshold torque, the clutch 185 may operate to transition the chuck 100 from the rapid jaw adjustment mode to the clamping mode. To do so, features of the clutch 185 may be configured to move or slip due to the additional torque required to turn the sleeve 110 and the inability of the jaws 110 to move further inward due to engagement with the working bit.

In this regard, the clutch 185 may be a partially circular spring member having spring arms 189 extending on both ends and, according to some example embodiments, a centrally located clutch lug 186. The spring arms 189 may include ramped protrusions 187 and clutch teeth 188. As best seen in FIG. 3, the clutch 185 may be operably coupled with the nut 115 via engagement between the clutch lug 186 and a nut slot 118 formed on a forward edge of the nut 115. As such, the clutch 185 may be configured to rotate with the nut 115 regardless of whether the chuck 100 is in the rapid jaw adjustment mode or the clamping mode.

Additionally, the ramped protrusions 187 of the clutch 185 may be engaged with slots 152 of the clamping member 150 as best seen in FIG. 3. The ramped protrusions 187 may include sloped or ramped edges (e.g., less than 90 degrees) to form ramps that facilitate the ramped protrusion 187's ability to move out of the clamping member mode slots 152 of the clamping member 150. In this regard, in the rapid jaw adjustment mode, the ramped protrusions 187 may be operably coupled with the clamping member mode slots 152, so that the clutch 185 rotates with the clamping member 150. Accordingly, when the ramped protrusions 187 are operably coupled with the clamping member mode slots 152, the sleeve 110 rotates the clamping member 150 via engagement between the sleeve lug 111 and the clamping member slot 153, the clamping member 150 rotates the clutch 185 via engagement between the ramped protrusion 187 and the clamping member mode slot 152, and the clutch 185 rotates the nut 115 via engagement between the clutch lug 186 and the nut slot 118. As such, rotation of the sleeve 110 causes rotation of the nut 115, when the chuck 100 is in the rapid jaw adjustment mode.

However, when the jaws 101 engage the working bit, and the required torque increases as described above, the ramped protrusions 187 of the clutch 185 move out of the clamping member mode slots 152 thereby causing the spring arms 189 to deflect inwards and the clutch teeth 188 operably couple with retainer teeth 181 of retainer 180, thereby transitioning the chuck 100 into the clamping mode. As best seen in FIG. 5, retainer 180 may be affixed (e.g., press fit) onto body 130, and retainer 180 may therefore move rotationally with body 130, which, in turn, moves rotationally with jaws 101. Accordingly, when the chuck 100 transitions into clamping mode and the clutch teeth 188 operably couple with retainer teeth 181, the clutch 185 is locked into engagement with the body 130 via the engagement with the retainer 180 which is affixed to the body 130. As such, relative movement between the clutch 185 and the body 130 can no longer occur. Additionally, since rotational movement of the clutch 185 relative to the jaws 101 is also prevented due to engagement of the clutch teeth 188 with the retainer teeth 181, relative movement of the nut 115 is also prevented due to the engagement of the clutch lug 186 with the nut slot 118.

However, further rotation of the sleeve 110 can continue and cause the clamping member 150 to rotate. Since the nut 115 is now fixed in position with and relative to the jaws 101 and the clamping member 150 is prohibited from moving axially rearward due to engagement with the washer 159, further rotation of the clamping member 150, via rotation of the sleeve, causes screw action to occur between the clamping member teeth 151 and the clamping nut teeth 117 due to the helically threaded coupling thereby forcing the nut 115 axially forward to cause the jaws 101 to clamp more tightly onto a working bit. In this regard, the clamping member teeth 151 and the clamping nut teeth 117 have a smaller slope than the nut teeth 116 and the jaw teeth 102. Further, the distance between each of the clamping member teeth 151 and each of the clamping nut teeth 117 is smaller, i.e., may have a smaller pitch, and therefore more teeth may be engaged to increase the frictional forces and permit tightening. As such, the jaw opening diameter change to sleeve turn ratio for the rapid jaw adjustment mode is greater than the jaw opening diameter change to sleeve turn ratio for the clamping mode. Further, since axial movement of the clamping member 150 in the rearward direction is prevented by the washer 159, the rotation of the clamping member 150 relative to the nut 115 moves the nut 115 axially forward and thus the jaws 101 into, for example, clamping engagement with a working bit. As mentioned above, since the slope of the helical threaded coupling of clamping member teeth 151 with the clamping nut teeth 117 is relatively small and due to the number of engaged teeth as a result of a smaller pitch, sufficient frictional forces can be generated between the clamping member teeth 151 and the clamping nut teeth 117 to permit the jaws 101 to tighten and clamp onto the working bit. Since, according to some example embodiments, the engagement between the clamping member teeth 151 and the clamping nut teeth 117 is being used to perform tightening and clamping, only relatively small tightening turn of the sleeve 110 is required once the chuck 100 transitions into clamping mode.

To move back out of clamping mode and into rapid jaw adjustment mode, the sleeve 110 may be turned to move the clamping member mode slot 152 back into engagement with the ramped protrusion 187 of the clutch 185, thereby releasing the operable coupling between the clutch teeth 188 and the retainer teeth 181 and transitioning into rapid jaw adjustment mode. Since the nut 115 is then free to rotate relative to the jaws 101, the jaws 101 may be further opened via continued turning of the sleeve 110 in the rapid jaw adjustment mode and the relatively high jaw opening diameter change to sleeve turn ratio.

FIGS. 6 through 9 illustrate another example chuck 200 and components thereof in various views that can be referenced together to facilitate understanding the various example embodiments. The chuck 200 may define a center axis 50. For orientation purposes, the chuck 200 may have a forward end 60 and a rearward end 70.

In general, the chuck 200 operates similarly to the chuck 100, with the exception of the clamping assembly 275 and the operation that leads to the engagement between the clutch 285 and the retainer 280. In this regard, the chuck 200 may include jaws 201 that operably couple with a body 230 and a nut 215. The chuck 200 may also include a clamping member 250 of the clamping assembly 275. The jaws 201, the body 230, the nut 215, and the claiming member 250 operate with respect to movement of the jaws 201 in the same or similar manner as the body 130, the nut 115, and the clamping member 150. In this regard, the nut 215, best seen in FIG. 9, may include nut teeth (not shown) for operable coupling with the jaw teeth of jaws 201, and the nut 215 may include nut clamping teeth 217 that operably couple with clamping member teeth (not shown) which collectively function and are embodied the same or similar to the nut clamping teeth 117 and the clamping member teeth 151. However, the engagement between the clamping member 250, the clutch 285, and the retainer 280 differs, as further described below. According to some example embodiments, the clamping assembly 275 may include the clamping member 250, a clutch push ring 256, and a clutch 285. According to some example embodiments, the clutch 200 may also include a compress spring 260.

The clamping member 250, which is operably coupled to rotate with the sleeve (not shown), is also operably coupled to, or is integrated with, a clutch push ring 256. The clutch push ring 256 may rotate with the clamping member 250. According to some example embodiments, the clutch push ring 256 may rotate with the clamping member 250 via operable coupling of a clutch push ring lug 255 with a clamping member slot 254. The clutch push ring 256 may also include one or more ramped protrusions 257 that operably couple to corresponding ramped recesses 286 in the clutch 285.

The clutch 285 may therefore operably couple with the clamping member 250 via the clutch push ring 256. The ramped recesses 286 of the clutch 285 may be complementary to the ramped protrusions 257 of the clutch push ring 256. In this regard, the ramped protrusions 257 may be ramped on one side to facilitate forward axial movement of the clutch 285 when the clamping member 250 is rotated in a direction that closes the jaws, but does not facilitate forward axial movement of the clutch 285 when the clamping member 250 is rotated in a direction that closes the jaws due to the absence of a ramp on an opposite side of the ramped protrusion 257. Further, the clutch 285 may include clutch teeth 288 disposed on a forward edge of the clutch 285. The clutch teeth 288 may be oriented to engage with rearward facing retainer teeth 281. In this regard, the clutch 200 may include a retainer 280, similar to retainer 180, that is affixed to body 230 and therefore rotates with the body 230.

As best seen in FIG. 9, the clutch 285 may operably couple to the nut 215 via a clutch lug 286 being disposed in a nut slot 218. In this regard, the operable coupling between the clutch lug 286 and the nut slot 218 may permit the clutch 285 to move axially relative to the nut 215, but remain in operable rotational coupling with the nut 215, regardless of whether the chuck 200 is in the rapid jaw adjustment mode or the clamping mode.

According to some example embodiments, as shown in FIG. 9, a compress spring 260 may be disposed between the retainer 280 and the clutch 250 and may be compressed between the retainer 280 and the clutch 250 to, for example, provide a spring bias between the retainer 280 and the clutch. In this regard, the compress spring 260 may rest on a forward surface of a seat feature (not shown) within the clutch 250 and may be engaged with a rearward surface of a feature of retainer 280 (e.g., a rearward facing retainer wall). As such, the compress spring 260 may provide forces that urge the retainer 280 away from the clutch 250 and assist with forcing the ramped protrusions 257 into the ramped recesses 286, when the ramped protrusions 257 are aligned with the ramped recesses 286. Further, the spring force and associated spring coefficient may be selected to offer a certain threshold force adjustment value for transitioning between the clamping mode and the rapid jaw adjustment mode.

Referring now to FIGS. 6 and 7, the operation of the chuck 200 when transitioning between the rapid jaw adjustment mode and clamping mode is described. In this regard, FIG. 6 shows the chuck 200 in the rapid jaw adjustment mode. As such, rotation of the sleeve (not shown), which is operably coupled to the clamping member 250, causes the clamping member 250 to also rotate. Rotation of the clamping member 250 in turn causes rotation of the clutch push ring 256 via the engagement between the clutch push ring lug 255 and the clamping member slot 254. In turn rotation of the clutch push ring 256 causes rotation of the clutch 285 due to the engagement between the ramped protrusions 257 of the clutch push ring 256 and the ramped recesses 286 of the clutch 285. Rotation of the clutch 285, in turn, rotates the nut 215 relative to the jaws 201 to cause the jaws 201 to move in the opening or closing direction in response to rotation of the nut 215 in accordance with the rapid jaw adjustment mode.

In FIG. 7, the jaws 201 have come into physical contact with a working bit 205. As such, the torque required to turn the sleeve has increased beyond a threshold torque to transition the chuck 200 into the clamping mode. Because the jaws 201 cannot close further, the nut 215 becomes rotationally stationary thereby causing the clutch 285 to be rotationally stationary. Accordingly, further rotation of the sleeve to at least a threshold torque rotates the clamping member 250 and causes the ramped protrusions 257 of clutch push ring 256 to slide, via the ramps, out of engagement with the ramped recesses 286 of the clutch 285, thereby forcing the clutch 285 to move axially forward such that the clutch teeth 288 operably couple with the retainer teeth 281 transitioning the chuck 200 into the clamping mode. The action of sliding out of engagement between the ramped protrusions 257 and the ramped recesses 286 may be performed against the bias force provided by the compress spring 260. Because the retainer 280 is affixed to the body 230, the clutch 285 and thus the nut 215 can no longer rotate relative to the jaws 201 and the body 230. As such, further rotation of the sleeve continues to cause the clamping member 250 to rotate. Since the nut 215 is now fixed in position with the jaws 201 and the clamping member 250 is restricted from axial movement in the rearward direction by the washer 259, further rotation of the clamping member 250, via rotation of the sleeve, causes screw action to occur between the clamping member teeth (not shown) and the clamping nut teeth 217 due to the helically threaded coupling thereby urging the nut 215 forward. As such, the rotation of the clamping member 250 relative to the nut 215 moves the nut 215 axially and thus the jaws 201 into, for example, clamping engagement with a working bit. Since the slope of the helical threaded coupling of clamping member teeth with the clamping nut teeth 217 is relatively small and due to the number of engaged teeth as a result of a smaller pitch, sufficient frictional forces can be generated between the clamping member teeth and the clamping nut teeth 217 to permit the jaws 201 to tighten and clamp onto the working bit. Since, according to some example embodiments, the engagement between the clamping member teeth and the clamping nut teeth 217 is being used to perform tightening and clamping, only a relatively small partial turn of the sleeve may be required once the chuck 200 transitions into clamping mode.

To move back out of clamping mode and into rapid jaw adjustment mode, the sleeve may be turned in the reverse direction to move ramped protrusions 257 back into engagement with the ramped recesses 286, thereby releasing the operable coupling between the clutch teeth 288 and the retainer teeth 281 and transitioning the chuck 200 into rapid jaw adjustment mode. According to some example embodiments, the forces imposed by the compress spring 260 on the retainer 280 and the clutch 250 may assist with transitioning the clutch teeth 288 out of operable coupling with the retainer teeth 281. Since the nut 215 is then free to rotate relative to the jaws 201, the jaws 201 may be further opened via continued turning of the sleeve 201 and associated rotation of the nut 215 in the rapid jaw adjustment mode.

Now referring to FIG. 10, another example chuck 300 is provided in according to some example embodiments. In this regard, the chuck 300 operates similar to the chucks 100 and 200, albeit with a different mechanism for transitioning between the rapid jaw adjustment mode and the clamping mode. In this regard, the components of the chuck 300 operate similar to those comparable components of chucks 100 and 200, with exceptions as described below. The chuck 300 also leverages two sets of helically threaded teeth with different slopes and pitches to offer efficient movement of the jaws as well as effective clamping. The chuck 300 may define a center axis 50. For orientation purposes, the chuck 300 may have a forward end 60 and a rearward end 70.

In this regard, the chuck 300 may include a jaws 301, a body 330, and a nut 315. The jaws 301 may, when the chuck 300 is in the rapid jaw adjustment mode, translate within passageways of the body 330 in response to relative rotation of the nut 315 due to the nut teeth 316 and the jaw teeth 302 being engaged in a helically threaded coupling. According to some example embodiments, the threaded teeth of the nut 315 and the jaws 302 may be configured such that the jaws 301 may translate from a maximum jaw opening diameter of 13 mm to a minimum jaw opening diameter of 1.5 mm in response to a half turn or 180 degree turn of the sleeve 310. For chuck 300, the sleeve 310 may operate as an adjustment ring and may be rotationally coupled to the nut 315, such that the nut 315 and the sleeve 310 rotate together regardless of the mode of the chuck 300. As such, turning the sleeve 310, e.g., in the jaw closing direction, may be performed until the jaws 301 engage the working bit 305 and the nut 315 prevented from further rotation.

The clamping assembly 375 of the chuck 300 may be configured differently and thus may operate differently while still providing the function of moving the nut 315 axially when in the clamping mode. In this regard, the clamping assembly 375 may include a clamping member 350 having clamping member teeth 351, and a spring washer 325. The clamping member 350 may operate as a locking or clamping ring and may be coupled to the body 330 in a manner that permits the clamping member 350 to rotate relative to the body 330. The clamping member 350 may not move axially relative to the body 330 thereby allowing the clamping member 350 to use the engagement with the body 330 as leverage to move the nut 315, and thus the jaws 301, axially relative to the body 330. In this regard, the clamping member teeth 351, which face inward towards the center axis 50, may operably couple with clamping nut teeth 317 via a helically threaded coupling. The clamping nut teeth 317 may be disposed on an outer face of the nut 315 and may face outwardly from the center axis 50 to operably couple with the inward facing clamping member teeth 351. The pitch of the clamping nut teeth 317 may be smaller than the pitch of the nut teeth 316, and the slope of the clamping nut teeth 317 may be less than the slope of the nut teeth 316.

The spring washer 325 may be disposed on a forward face of the nut 315 and may be configured to apply a rearward force on the nut 315 in response to forward axial movement of the nut 315. According to some example embodiments, spring washer 325 may operate to provide a spring bias to facilitate a threshold force adjustment value based on the spring strength or spring coefficient. The rearward force applied by the spring washer 325 may be the result of engagement between the spring washer 325 and the body 330. The rearward force may operate to hold the nut 315 in place by increasing frictional forces in response to forward axial movement of the nut 315 to clamp the jaws 301 on the working bit 305 in the clamping mode.

In operation, to install a working bit 305, rotation of the sleeve 310 may be performed to rotate the nut 315 relative to jaws 301 to translate the jaws 301 forward and closed in the rapid jaw adjustment mode. When the jaws 301 engage the working bit 305, the nut 315 can no longer rotate. A user may then turn the clamping member 350, thereby transitioning into the clamping mode, to clamp the jaws 301 onto the working bit 305. To do so, in response to the clamping member 350 being turned, the helically threaded coupling between the clamping member teeth 351 and the clamping nut teeth 317 will cause the nut 315 to translate forward. Accordingly, the spring washer 325 on the nut 315 will engage with the body 330 thereby applying the rearward force on the nut 315 and applying additional force on the clamping member teeth 351 to increase the friction between the clamping member teeth 351 and the clamping nut teeth 317 to tighten and clamp the nut 315 and the jaws 301 in position. To release the clamp on the working bit 305, the clamping member 350 may be rotated in the opposite direction to move the nut 315 axially in a rearward direction such that the spring washer 325 disengages from the body 330, thereby transitioning from the clamping mode to the rapid jaw adjustment mode, and the nut 315 can be rotated relative jaws 301.

Now referring to FIG. 11, another example chuck 400 is provided in according to some example embodiments. In this regard, the chuck 400 operates similar to the chucks 100, 200, and particularly 300, albeit with a different mechanism for transitioning between the rapid jaw adjustment mode and the clamping mode. In this regard, the components of the chuck 400 operate similar to those comparable components of chuck 300, with exceptions as described below. The chuck 400 also leverages two sets of helically threaded teeth with different slopes and pitches to offer efficient movement of the jaws as well as effective clamping. The chuck 400 may define a center axis 50. For orientation purposes, the chuck 400 may have a forward end 60 and a rearward end 70.

In this regard, the chuck 400 may include a jaws 401, a body 430, and a nut 415. The jaws 401 may, when the chuck 400 is in the rapid jaw adjustment mode, translate within passageways of the body 430 in response to relative rotation of the nut 415 due to the nut teeth 416 and the jaw teeth 402 being engaged in a helically threaded coupling. For chuck 400, the sleeve 410 may be integrated with the clamping member 450 to include clamping member teeth 451 and a mode recess 452.

The nut 415 may include clamping nut teeth 417 that may be disposed on an outer face of the nut 415 and may face outwardly from the center axis 50 to operably couple with the inward facing clamping member teeth 451. The clamping nut teeth 417 and the clamping member teeth 451 may be engaged in a helically threaded coupling. The pitch of the clamping nut teeth 417 may be smaller than the pitch of the nut teeth 416, and the slope of the clamping nut teeth 417 may be less than the slope of the nut teeth 416.

With reference to both FIGS. 11 and 12, the nut 415 may also include a deflection arm 420 with a nub 421 disposed on the deflection arm 420. According to some example embodiments, the nub 421 may have rounded convex edges to facilitate movement into and out of the mode recess 452 of the clamping member 450, which may also have rounded concave edges. In this regard, the operable coupling between the nub 421 and the mode recess 452 may operate to cause the nut 415 to move with sleeve 410 and the integrated clamping member 450 when in the rapid jaw adjustment mode. When the jaws 401 engage with the working bit 405, the nut 415 may no longer be able to turn relative to the jaws 401. As such, further torque on the sleeve 410 is required to turn the sleeve 410 and upon applying more than this threshold amount of torque, sleeve 410 and the clamping member 450 may transition into the clamping mode and rotate relative to the nut 415. The torque required to move the sleeve 410 after the jaws 401 engage the working bit 405 may be based on the engagement of the nub 421 in the mode recess 452 and the force applied on the nub 421 by the deflection arm 420. Accordingly, the relative rotation of the sleeve 410 and the clamping member 450 to the nut 415 causes the helically threaded coupling of the clamping nut teeth 417 with the clamping member teeth 451 to move the nut 315 in an axial direction. This relative rotation between the sleeve 410 with clamping member 450 to the nut 415 also overcomes the forces holding the nub 421 in engagement with the mode recess 452 and pulls the nub 421 out of engagement with the mode recess 452 of the clamping member 450. In this regard, since the nut 415 is rotationally stationary due to the engagement of the jaws 401 with the working bit 405, the sleeve 410 and the clamping member 450 may move relative to the nut 415 and the deflection arm 420 in the direction of arrow 423 upon further rotation of the clamping member 450. This motion operates to deflect the deflection arm 420 inward in response to the mode recess 452 moving out of engagement with the nub 421. As such, the deflection arm 420 and nub 421 operate hold the sleeve 410 and the nut 415 in rotational coupling while in the rapid jaw adjustment mode, but also provide a torque threshold that permits the sleeve 410 and the clamping member 450 to move relative to the nut 415, in the clamping mode, and move the nut 415 axially to clamp the jaws 401 on the working bit 405.

As such, the clamping assembly 475 may include a clamping member 450 having clamping member teeth 451 and the mode recess 452, and a spring washer 425. The clamping member 415, which is integrated with the sleeve 410, may be coupled to the body 430 in a manner that permits the clamping member 450 to rotate relative to the body 430. The clamping member 450 may not move axially relative to the body 430 thereby allowing the clamping member 450 to use the engagement with the body 430 as leverage to move the nut 415, and thus the jaws 401, axially relative to the body 430 in the clamping mode.

The spring washer 425 may be disposed on a forward face of the nut 415 and may be configured to apply a rearward force on the nut 415 in response to forward axial movement of the nut 415. According to some example embodiments, spring washer 425 may operate to provide a spring bias to facilitate a threshold force adjustment value based on the spring strength or spring coefficient. The rearward force applied by the spring washer 425 may be the result of engagement between the spring washer 425 and the body 430 that occurs in response to the forward axial movement of the nut 415. The rearward force may operate increase frictional forces between the clamping member teeth 451 and the clamping nut teeth 417 to hold the nut 415 in place after clamping the jaws 401 on the working bit 405 in the clamping mode.

In operation, to install a working bit 405, rotation of the sleeve 410 may be performed to rotate the nut 415 relative to jaws 401 to translate the jaws 401 forward and closed in the rapid jaw adjustment mode due to engagement of the nub 421 with the mode recess 452. When the jaws 401 engage the working bit 405, the nut 415 can no longer rotate. Upon applying at least a threshold torque on the sleeve 410 and the clamping member 450 by the user, the mode recess 452 may slip out engagement with the nub 421, thereby transitioning into the clamping mode, and the sleeve 410 and clamping member 450 may rotate relative to the nut 415. Due to the helically threaded coupling between the clamping member teeth 451 and the clamping nut teeth 417, the nut 415 will translate forward. Accordingly, the spring washer 425 on the nut 415 will engage with the body 430 thereby applying the rearward force on the nut and additional force on the clamping member teeth 451 to increase the friction between the clamping member teeth 451 and the clamping nut teeth 417 to allow for tightening and clamping the nut 415 and the jaws 401 in position. To release the clamp on the working bit 405, the clamping member 450 may be rotated in the opposite direction to move the nut 415 axially in a rearward direction such that the spring washer 425 disengages from the body 430, thereby transitioning from the clamping mode to the rapid jaw adjustment mode, and the nut 415 can be rotated relative jaws 401.

Now referring to FIGS. 13-16, another example chuck 500 is provided in accordance with some example embodiments. In this regard, the chuck 500 operates similar to the chucks 100, 200, 300, and 400, albeit with a different mechanism for transitioning between the rapid jaw adjustment mode and the clamping mode, and for effectuating axial movement of the nut when in the clamping mode. In this regard, the components of the chuck 500 operate similar to those comparable components of the other example chucks, with exceptions as described below. In general, the chuck 500 leverages ramps to cause the nut to move axially once a threshold torque is surpassed due to engagement of the jaws with a working bit. The chuck 500 may define a center axis 50. For orientation purposes, the chuck 500 may have a forward end 60 and a rearward end 70.

In this regard, the chuck 500 may include a jaws 501, a body 530, and a nut 515. The jaws 501 may, when the chuck 500 is in the rapid jaw adjustment mode, translate within passageways of the body 530 in response to relative rotation of the nut 515 due to the nut teeth 516 and the jaw teeth 502 being engaged in a helically threaded coupling. For chuck 500, the sleeve 510 may be operably coupled to the nut 315 via a clamping member 550, such that the nut 515 and the sleeve 510 rotate together when in the rapid jaw adjustment mode, but the clamping member 550 operates to decouple the sleeve 510 from the nut 515 such that rotation of the sleeve causes axial movement of the nut 515 when in the clamping mode.

The clamping assembly 575 of the chuck 500 may include a clamping member 550 having clamping ramps 551, and a spring washer 525. The clamping ramps 551 may be angled protrusions on a forward surface of the ring-shaped clamping member 550 that operably couple with complementary mode recesses 517 disposed on an rearward surface of the nut 515. In this regard, the clamping ramps 551 may be disposed in a circular pattern about a circumference of the clamping member 550 and similarly, the mode recesses 517 may be disposed in a circular pattern about a circumference of the nut 515.

In this regard, the clamping ramps 551 may be disposed in the mode recesses 517 when the chuck 500 is in the rapid jaw adjustment mode. The engagement between the clamping ramps 551 and the mode recesses 517 may allow rotation of the sleeve 510, which is rotationally coupled to the clamping member 550, to cause rotation of the nut 515 relative to the jaws 501 until the jaws 501 contact the working bit 505. Because the jaws 501 are prevented from further translation due to engagement with the working bit 505, the nut 515 can no longer rotate. To further rotate the sleeve 510, additional torque may be applied at or above a torque threshold to cause the clamping ramps 551 to slide out of engagement with mode recesses 517. As seen in FIG. 16, rotation of the clamping member 550 relative to the nut 515 in the direction of the arrow 590 (because the nut is rotationally fixed due to the jaws 501 being engaged with the working bit 505) causes the clamping ramp 551 to slide out of the mode recess 517 and also causing the nut 515 to ride up the clamping ramp 551 thereby forcing the nut 515 axially forward as indicated by arrow 591. Because the nut 551 is engaged with the jaws 501 this axial forward movement of the nut 515 causes a spring washer 525 disposed on a forward face of the nut 515 to engage between the nut 515 and the body 530 to provide a rearward force on the nut 515. By operation of the rearward force provided by the spring washer 525, friction between the clamping ramps 551 and the nut 515 is increased to permit tightening and clamping of the jaws 501 onto the working bit 505.

Now referring to FIGS. 17-22, another example chuck 600 is provided in accordance with some example embodiments. In this regard, the chuck 600 operates similar to the chucks 100, 200, 300, 400, and 500, albeit with a different mechanism for transitioning between the rapid jaw adjustment mode and the clamping mode, and for effectuating axial movement of the nut when in the clamping mode. In this regard, the components of the chuck 600 operate similar to those comparable components of the other example chucks, with exceptions as described below. In general, the chuck 600 also leverages ramps to cause the nut to move axially once a threshold torque is surpassed due to engagement of the jaws with a working bit. The chuck 600 may define a center axis 50. For orientation purposes, the chuck 600 may have a forward end 60 and a rearward end 70.

In this regard, the chuck 600 may include a jaws 601, a body 630, and a nut 615. The jaws 601 may, when the chuck 600 is in the rapid jaw adjustment mode, translate within passageways of the body 630 in response to relative rotation of the nut 615 due to the nut teeth 616 and the jaw teeth 602 being engaged in a helically threaded coupling. For chuck 600, the sleeve 610 may be operably coupled to the nut 615 via a clamping member 650 and bearing 660, such that the nut 615 and the sleeve 610 rotate together when in the rapid jaw adjustment mode, but the clamping member 650 operates to decouple the sleeve 610 from the nut 615 such that rotation of the sleeve 610 causes axial movement of the nut 615 when in the clamping mode.

The clamping assembly 675 of the chuck 600 may include a clamping member 650 and a spring washer 625. The clamping member 650 may include clamping ramps 651. The clamping ramps 651 may be embodied as angled cavities (e.g., having a right triangle shape) on a forward surface of the ring-shaped clamping member 650 that operably couple with complementary mode recesses 617 (e.g., having a right triangle shape) disposed on an a rearward surface of the nut 615. In some example embodiments, the clamping ramps 651 may protrude from the forward surface of the clamping member 650. In this regard, the clamping ramps 651 may be disposed in a circular pattern about a circumference of the clamping member 650 and similarly, the mode recesses 617 may be disposed in a circular pattern about a circumference of the nut 615. A bearing 660 having bearing balls 653 may be disposed between the nut 615 and the clamping member 650.

As shown FIG. 21, the clamping ramps 651 may be aligned with the mode recesses 617 with bearing balls 653 disposed therebetween when the chuck 600 is in the rapid jaw adjustment mode. As such, a distance 690 between the nut 615 and the clamping member 650 may be defined as the diameter of the bearing balls 653. The engagement between the clamping ramps 651 and the mode recesses 617 via the bearing balls 653 may allow rotation of the sleeve 610, which is rotationally coupled to the clamping member 650, to cause rotation of the nut 615 relative to the jaws 601 until the jaws 601 contact the working bit 605. Because the jaws 601 are prevented from further translation due to engagement with the working bit 605, the nut 615 can no longer rotate. To further rotate the sleeve 610, additional torque may be applied at or above a torque threshold to cause the clamping member 650 to slip relative to the nut 615, as shown in FIG. 22. Relative movement of the clamping member 650 to the nut 615 may cause the clamping ramps 651 to move out of alignment with the mode recesses 617 thereby increasing a distance between the nut 615 and the clamping member 650 by, for example, a distance 691. In this regard, as seen in FIG. 22, the clamping member 650 may rotate in the direction of arrow 692 relative to the nut 615 causing the bearing balls to roll as indicated by arrow 694 and causing the nut 615 to move axially forward in the direction of the arrow 693. Because the nut 651 is engaged with the jaws 601, this axial forward movement of the nut 615 causes a spring washer 625 disposed on a forward face of the nut 615 to engage between the nut 615 and the body 630 to provide a rearward force on the nut 615. By operation of the rearward force provided by the spring washer 625, friction between the clamping ramps 651, the bearing balls 653, and the mode recesses 617 is increased to permit tightening and clamping of the jaws 601 onto the working bit 605. In this regard, according to some example embodiments, spring washer 625 may operate to provide a spring bias to facilitate a threshold force adjustment value based on the spring strength or spring coefficient.

According to some example embodiments, an example chuck for use with a power driver having a rotatable drive spindle is provided. The chuck may comprise a plurality of jaws, wherein each jaw includes jaw teeth. The chuck may further comprise a body. In this regard, the plurality of jaws may be configured to rotate with the body about a center axis of the chuck. The chuck may further comprise a sleeve and a nut having nut teeth. The nut teeth may be operably coupled with at least some of the jaw teeth in a helically threaded coupling. The chuck may further comprise a clamping assembly comprising a clamping member that operably couples the sleeve to the nut. The clamping assembly may be configured to transition the chuck between a rapid jaw adjustment mode and a clamping mode. In the rapid jaw adjustment mode, the sleeve may be configured to rotate the clamping member with the nut to cause rotational movement of the nut relative to the jaws and the body, which may cause translational movement of the jaws relative to the body. In the clamping mode, the nut is rotationally fixed with the jaws and the clamping member rotates relative to the nut to cause the nut to move axially relative to the center axis which causes the jaws to translate relative to the body.

According to some example embodiments, the clamping assembly is configured to transition the chuck between the rapid jaw adjustment mode and the clamping mode in response to a torque required to turn the sleeve exceeding a threshold torque. According to some example embodiments, the chuck may further comprise a retainer configured to rotate with the body, where the retainer includes retainer teeth. The clamping assembly may further comprise a clutch member including clutch teeth. The clutch member may be operably coupled to the nut such that the clutch member rotates with the nut. Further, as the clamping assembly transitions the chuck into the clamping mode in response to a threshold torque being required to turn the sleeve, further rotation of the sleeve causes the clutch teeth to operably couple with the retainer teeth to rotationally couple the nut to the body and prevent further rotational movement of the nut relative to the body and the jaws. According to some example embodiments, the clutch member may further comprise a spring arm and a clutch protrusion, and the clutch teeth and the clutch protrusion may be disposed on the spring arm. Additionally, to transition the chuck into the clamping mode in response to a threshold torque being required to turn the sleeve, further rotation of the sleeve may deflect the spring arm in response to engagement between the clutch protrusion and the clamping member to cause the operable coupling of the clutch teeth with the retainer teeth. According to some example embodiments, the clamping member may further comprise a ramp and the clutch member further comprises a ramped recess. Additionally, to transition the chuck into the clamping mode in response to a threshold torque being required to turn the sleeve, further rotation of the sleeve may force the ramp of the clamping member to slide out of the ramp recess of the clutch member, which may cause the clutch member to move axially and cause the operable coupling of the clutch teeth with the retainer teeth. According to some example embodiments, the clamping member may include clamping member teeth configured to rotate with the sleeve to cause, in response to a threshold torque being required to turn the sleeve to transition the chuck into the clamping mode, the nut to move axially via a helical threaded coupling between the clamping member teeth and clamping nut teeth disposed on the nut. According to some example embodiments, a slope of the helical threaded coupling between the nut teeth and the jaw teeth may be larger than a slope of the helical threaded coupling between the clamping member teeth and the clamping nut teeth. According to some example embodiments, the nut may include a deflection arm with a nub that is operably coupled with a mode recess of the clamping member in the rapid jaw adjustment mode. In this regard, in response to a threshold torque being required to turn the sleeve to transition the chuck into the clamping mode, the nub may move out of operable coupling with the mode recess and the clamping member may rotate relative to the nut. According to some example embodiments, the clamping member may include a ramp that is operably coupled to the nut. In this regard, to transition the chuck into the clamping mode in response to a threshold torque being required to turn the sleeve, engagement of the ramp with the nut may cause the nut to move axially with the jaws. According to some example embodiments, the ramp of the clamping member may be operably coupled to the nut via a plurality of balls.

According to some example embodiments, another example chuck for use with a power driver having a rotatable drive spindle is provided. The chuck may comprise a plurality of jaws with each jaw including jaw teeth. The chuck may further comprise a body. In this regard, the plurality of jaws may be configured to rotate with the body about a center axis of the chuck. The chuck may further comprise a sleeve and a nut having nut teeth. The nut teeth may be operably coupled with at least some of the jaw teeth in a helically threaded coupling. The chuck may further comprise a clamping assembly comprising a clamping member that operably couples the sleeve to the nut. The clamping assembly may be configured to transition the chuck between a rapid jaw adjustment mode and a clamping mode. In the rapid jaw adjustment mode, the sleeve may be configured to rotate the clamping member with the nut to cause rotational movement of the nut relative to the jaws and the body which may cause translational movement of the jaws relative to the body at a first jaw opening diameter change to sleeve turn ratio. In the clamping mode, the nut may be rotationally fixed with the jaws and the sleeve may be configured to rotate the clamping member relative to the nut to cause the nut to move axially relative to the center axis which may cause the jaws to translate relative to the body at a second jaw opening diameter change to sleeve turn ratio. In this regard, the first jaw opening diameter change to sleeve turn ratio is greater than the second jaw opening diameter change to sleeve turn ratio.

According to some example embodiments, the clamping assembly may be configured to transition the chuck between the rapid jaw adjustment mode and the clamping mode in response to a torque required to turn the sleeve exceeding a threshold torque. According to some example embodiments, the chuck may further comprise a retainer configured to rotate with the body, where the retainer includes retainer teeth. In this regard, the clamping assembly may further comprise a clutch member including clutch teeth. The clutch member may be operably coupled to the nut such that the clutch member rotates with the nut. Additionally, as clamping assembly transitions the chuck into the clamping mode in response to a threshold torque being required to turn the sleeve, further rotation of the sleeve may cause the clutch teeth to operably couple with the retainer teeth to rotationally couple the nut to the body and prevent rotational movement of the nut relative to the body and the jaws. According to some example embodiments, the clutch member may further comprise a spring arm and a clutch protrusion. The clutch teeth and the clutch protrusion may be disposed on the spring arm. To transition the chuck into the clamping mode in response to a threshold torque may be required to turn the sleeve, further rotation of the sleeve deflects the spring arm in response to engagement between the clutch protrusion and the clamping member to cause the operable coupling of the clutch teeth with the retainer teeth. According to some example embodiments, the clamping member may further comprise a ramp and the clutch member further comprises a ramped recess. To transition the chuck into the clamping mode in response to a threshold torque being required to turn the sleeve, further rotation of the sleeve forces the ramp of the clutch member to slide out of the ramp recess of the clutch member, which causes the clutch member to move axially and causes the operable coupling of the clutch teeth with the retainer teeth. According to some example embodiments, the clamping member may include clamping member teeth configured to rotate with the sleeve to cause, in response to a threshold torque being required to turn the sleeve to transition the chuck into the clamping mode, the nut to move axially via a helical threaded coupling between the clamping member teeth and clamping nut teeth disposed on the nut. According to some example embodiments, a slope of the helical threaded coupling between the nut teeth and the jaw teeth is larger than a slope of the helical threaded coupling between the clamping member teeth and the clamping nut teeth. According to some example embodiments, the nut may include a deflection arm with a nub that is operably coupled with a mode recess of the clamping member in the rapid jaw adjustment mode. In this regard, in response to a threshold torque being required to turn the sleeve to transition the chuck into the clamping mode, the nub may move out of operable coupling with the mode recess and the clamping member may rotate relative to the nut. According to some example embodiments, the clamping member may include a ramp that is operably coupled to the nut, and wherein, to transition the chuck into the clamping mode in response to a threshold torque being required to turn the sleeve, engagement of the ramp with the nut causes the nut to move axially with the jaws. According to some example embodiments, the ramp of the clamping member may be operably coupled to the nut via a plurality of balls.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A chuck for use with a power driver having a rotatable drive spindle, the chuck comprising:
    a plurality of jaws, each jaw including jaw teeth;
    a body, wherein the plurality of jaws are configured to rotate with the body about a center axis of the chuck;
    a sleeve;
    a nut having nut teeth, the nut teeth being operably coupled with at least some of the jaw teeth in a helically threaded coupling;
    a clamping assembly comprising a clamping member that operably couples the sleeve to the nut, the clamping assembly being configured to transition the chuck between a rapid jaw adjustment mode and a clamping mode; and
    a retainer configured to rotate with the body, the retainer having retainer teeth;
    wherein, in the rapid jaw adjustment mode, the sleeve is configured to rotate the clamping member with the nut to cause rotational movement of the nut relative to the jaws and the body, which causes translational movement of the jaws relative to the body;
    wherein, in the clamping mode, the nut is rotationally fixed with the jaws and the clamping member rotates relative to the nut to cause the nut to move axially relative to the center axis which causes the jaws to translate relative to the body;
    wherein the clamping assembly further comprises a clutch member including clutch teeth, the clutch member being operably coupled to the nut such that the clutch member rotates with the nut;
    wherein, as the clamping assembly transitions the chuck into the clamping mode in response to a threshold torque being required to turn the sleeve, further rotation of the sleeve causes the clutch teeth to operably couple with the retainer teeth to rotationally couple the nut to the body and prevent further rotational movement of the nut relative to the body and the jaws.

2. The chuck of claim 1, wherein the clamping assembly is configured to transition the chuck between the rapid jaw adjustment mode and the clamping mode in response to a torque required to turn the sleeve exceeding a threshold torque.

3. The chuck of claim 1, wherein the clutch member further comprises a spring arm and a clutch protrusion, wherein the clutch teeth and the clutch protrusion are disposed on the spring arm;
    wherein, to transition the chuck into the clamping mode in response to a threshold torque being required to turn the sleeve, further rotation of the sleeve deflects the spring arm in response to engagement between the clutch protrusion and the clamping member to cause the operable coupling of the clutch teeth with the retainer teeth.

4. The chuck of claim 1, wherein the clamping member further comprises a ramp and the clutch member further comprises a ramped recess;
    wherein, to transition the chuck into the clamping mode in response to a threshold torque being required to turn the sleeve, further rotation of the sleeve forces the ramp of the clamping member to slide out of the ramp recess of the clutch member, which causes the clutch member to move axially and causes the operable coupling of the clutch teeth with the retainer teeth.

5. The chuck of claim 1, wherein the clamping member includes clamping member teeth configured to rotate with the sleeve to cause, in response to a threshold torque being required to turn the sleeve to transition the chuck into the clamping mode, the nut to move axially via a helical threaded coupling between the clamping member teeth and clamping nut teeth disposed on the nut.

6. The chuck of claim 5, wherein a slope of the helical threaded coupling between the nut teeth and the jaw teeth is larger than a slope of the helical threaded coupling between the clamping member teeth and the clamping nut teeth.

7. A chuck for use with a power driver having a rotatable drive spindle, the chuck comprising:
    a plurality of jaws, each jaw including jaw teeth;
    a body, wherein the plurality of jaws are configured to rotate with the body about a center axis of the chuck;
    a sleeve;
    a nut having nut teeth, the nut teeth being operably coupled with at least some of the jaw teeth in a helically threaded coupling;
    a clamping assembly comprising a clamping member that operably couples the sleeve to the nut, the clamping assembly being configured to transition the chuck between a rapid jaw adjustment mode and a clamping mode; and
    a retainer that rotates with the body, the retainer having retainer teeth;
    wherein, in the rapid jaw adjustment mode, the sleeve is configured to rotate the clamping member with the nut to cause rotational movement of the nut relative to the jaws and the body, which causes translational movement of the jaws relative to the body at a first jaw opening diameter change to sleeve turn ratio;

wherein, in the clamping mode, the nut is rotationally fixed with the jaws and the sleeve is configured to rotate the clamping member relative to the nut to cause the nut to move axially relative to the center axis which causes the jaws to translate relative to the body at a second jaw opening diameter change to sleeve turn ratio;

wherein the first jaw opening diameter change to sleeve turn ratio is greater than the second jaw opening diameter change to sleeve turn ratio;

wherein the clamping assembly further comprises a clutch member including clutch teeth, the clutch member being operably coupled to the nut such that the clutch member rotates with the nut;

wherein, as clamping assembly transitions the chuck into the clamping mode in response to a threshold torque being required to turn the sleeve, further rotation of the sleeve causes the clutch teeth to operably couple with the retainer teeth to rotationally couple the nut to the body and prevent rotational movement of the nut relative to the body and the jaws.

8. The chuck of claim 7, wherein the clamping assembly is configured to transition the chuck between the rapid jaw adjustment mode and the clamping mode in response to a torque required to turn the sleeve exceeding a threshold torque.

9. The chuck of claim 7, wherein the clutch member further comprises a spring arm and a clutch protrusion, wherein the clutch teeth and the clutch protrusion are disposed on the spring arm;

wherein, to transition the chuck into the clamping mode in response to a threshold torque being required to turn the sleeve, further rotation of the sleeve deflects the spring arm in response to engagement between the clutch protrusion and the clamping member to cause the operable coupling of the clutch teeth with the retainer teeth.

10. The chuck of claim 7, wherein the clamping member further comprises a ramp and the clutch member further comprises a ramped recess;

wherein, to transition the chuck into the clamping mode in response to a threshold torque being required to turn the sleeve, further rotation of the sleeve forces the ramp of the clamping member to slide out of the ramp recess of the clutch member, which causes the clutch member to move axially and causes the operable coupling of the clutch teeth with the retainer teeth.

11. The chuck of claim 7, wherein the clamping member includes clamping member teeth configured to rotate with the sleeve to cause, in response to a threshold torque being required to turn the sleeve to transition the chuck into the clamping mode, the nut to move axially via a helical threaded coupling between the clamping member teeth and clamping nut teeth disposed on the nut.

12. The chuck of claim 11, wherein a slope of the helical threaded coupling between the nut teeth and the jaw teeth is larger than a slope of the helical threaded coupling between the clamping member teeth and the clamping nut teeth.

* * * * *